(12) United States Patent
Yoshihara et al.

(10) Patent No.: US 8,946,335 B2
(45) Date of Patent: Feb. 3, 2015

(54) HIGHLY THERMALLY CONDUCTIVE THERMOPLASTIC RESIN COMPOSITION AND THERMOPLASTIC RESIN

(75) Inventors: Shusuke Yoshihara, Osaka (JP); Kazuaki Matsumoto, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/126,246

(22) PCT Filed: Oct. 28, 2009

(86) PCT No.: PCT/JP2009/005700
§ 371 (c)(1), (2), (4) Date: Apr. 27, 2011

(87) PCT Pub. No.: WO2010/050202
PCT Pub. Date: May 6, 2010

(65) Prior Publication Data
US 2011/0204282 A1 Aug. 25, 2011

(30) Foreign Application Priority Data

Oct. 30, 2008 (JP) ................................. 2008-280140
Apr. 1, 2009 (JP) ................................. 2009-088950
Jun. 15, 2009 (JP) ................................. 2009-142467

(51) Int. Cl.
*C08K 3/22* (2006.01)
*C08L 67/00* (2006.01)
*C08K 3/00* (2006.01)
*C08K 3/28* (2006.01)

(52) U.S. Cl.
CPC .................. *C08K 3/0033* (2013.01); *C08K 3/22* (2013.01); *C08K 3/28* (2013.01)
USPC ........... 524/428; 524/430; 528/272; 528/307; 528/308

(58) Field of Classification Search
CPC ............. C08L 67/03; C08K 3/22; C08K 3/28
USPC .......... 524/492–497, 401–428; 528/307–308, 528/272
See application file for complete search history.

(56) References Cited

U.S. PATENT DOCUMENTS

| | | | |
|---|---|---|---|
| 4,539,386 A | 9/1985 | Yoon | |
| 4,837,407 A | 6/1989 | Nezu | |
| 4,904,752 A | 2/1990 | Kanoe et al. | |
| 4,904,757 A * | 2/1990 | Coassolo et al. | 528/272 |
| 5,068,052 A * | 11/1991 | Watanabe et al. | 252/299.01 |
| 5,138,022 A * | 8/1992 | Mang et al. | 528/272 |
| 5,258,134 A | 11/1993 | Yoshinaga et al. | |
| 5,306,806 A * | 4/1994 | Tanabe et al. | 528/308 |
| 6,261,481 B1 * | 7/2001 | Akatsuka et al. | 252/567 |
| 6,369,157 B1 | 4/2002 | Winckler et al. | |
| 6,680,002 B2 | 1/2004 | Yamauchi et al. | |
| 6,784,260 B2 * | 8/2004 | Yeager et al. | 525/523 |
| 7,056,988 B2 | 6/2006 | Yao | |
| 7,109,288 B2 | 9/2006 | Akatsuka et al. | |
| 2001/0049430 A1 | 12/2001 | Winckler et al. | |
| 2003/0094725 A1 | 5/2003 | Yao | |
| 2003/0168634 A1 | 9/2003 | Yamauchi et al. | |
| 2004/0147709 A1 | 7/2004 | Akatsuka et al. | |
| 2004/0224163 A1 * | 11/2004 | Tobita et al. | 428/413 |
| 2006/0276568 A1 | 12/2006 | Akatsuka et al. | |
| 2008/0242772 A1 | 10/2008 | Nakamura et al. | |
| 2009/0091045 A1 * | 4/2009 | Tanikawa et al. | 257/791 |
| 2010/0016498 A1 | 1/2010 | Kaji et al. | |
| 2010/0080997 A1 * | 4/2010 | Seki et al. | 428/418 |
| 2011/0204282 A1 | 8/2011 | Yoshihara et al. | |
| 2012/0175549 A1 | 7/2012 | Yoshihara et al. | |

FOREIGN PATENT DOCUMENTS

| | | |
|---|---|---|
| DE | 4226994 A1 | 2/1994 |
| EP | 0 612 802 A1 | 8/1994 |
| JP | 60-40127 A | 3/1985 |
| JP | 61-296068 A | 12/1986 |
| JP | 63-125521 A | 5/1988 |
| JP | 63-264828 A | 11/1988 |
| JP | 1-149303 A | 6/1989 |
| JP | 02-005307 A | 1/1990 |
| JP | 02-028352 A | 1/1990 |
| JP | 02-127438 A | 5/1990 |
| JP | 06-298928 A | 10/1994 |
| JP | 08-143653 A | 6/1996 |
| JP | 2000-080257 A | 3/2000 |
| JP | 2002-284864 A | 10/2002 |
| JP | 2002-371129 A | 12/2002 |
| JP | 2003-246923 A | 9/2003 |
| JP | 2003-268070 A | 9/2003 |

(Continued)

OTHER PUBLICATIONS

Scaffaro (Effects of Filler Type and Mixing Method on the Physical Properties of a Reinforced Semirigid Liquid Crystal Polymer. Eur. Polym. J. vol. 32. No. 7, pp. 869-875).*

Maeda (High-pressure DTA study on liquid crystalline polyesters with biphenyl as mesogen. Thermochimica Acta. 266 (1995) 189-202).*

Su (Thermoplastic and Thermoset Main Chain Liquid Crystal Polymers Prepared from Biphenyl Mesogen. Journal of Polymer Science: Part A: Polymer Chemistry, 31 (1993) 3251-3256).*

(Continued)

*Primary Examiner* — Brieann R Fink
(74) *Attorney, Agent, or Firm* — Westerman, Hattori, Daniels & Adrian, LLP

(57) ABSTRACT

A thermoplastic resin composition according to the present invention contains an inorganic filler and a thermoplastic resin whose main chain contains a repeating unit represented by the general formula (1):

$$-M-Sp- \ldots \quad (1)$$

wherein M represents a mesogenic group; and Sp represents a spacer.

23 Claims, No Drawings

(56) References Cited

FOREIGN PATENT DOCUMENTS

| | | |
|---|---|---|
| JP | 2007-224060 A | 9/2007 |
| JP | 2008-150525 A | 7/2008 |
| JP | 2008-169265 A | 7/2008 |
| JP | 04-249528 A | 4/2009 |
| JP | 2009-091440 A | 4/2009 |
| JP | 2010-037474 A | 2/2010 |
| JP | 2010-150377 A | 7/2010 |
| JP | 2011-52204 A | 3/2011 |
| JP | 2011-063790 A | 3/2011 |
| JP | 2011-084714 A | 4/2011 |
| JP | 2011-084715 A | 4/2011 |
| JP | 2011-084716 A | 4/2011 |
| WO | 02/094905 A1 | 11/2002 |
| WO | 2006/120993 A1 | 11/2006 |
| WO | 2010/050202 A1 | 5/2010 |
| WO | 2011/033815 A1 | 3/2011 |

OTHER PUBLICATIONS

Asrar (Thermotropic Homopolyesters. I. The Preparation and Properties of Polymers Based on 4,4'-Dihydroxybiphenyl. Journal of Polymer Science: Polymer Physics Edition. 21 (1983) 1119-1131).*
Notiofication of Transmittal of Translation of the International Preliminary Report on Patentability (Form PCT/IB/338) of International Application No. PCT/JP2009/005700 mailed Jul. 7, 2011 with Form PCT/IPEA/409.
C. L. Choy, et al, "Thermal conductivity of highly oriented polyethylene", Polymer, Feb. 1978, pp. 155-162, vol. 19.
Kurt Geibel, et al, "In Situ Photopolymerized, Oriented Liquid-Crystalline Diacrylates with High Thermal Conductivities", Advanced Materials, 1993, pp. 107-109, vol. 5, No. 2.
International Search Report of PCT/JP2009/005700, mail date of Jan. 19, 2010.
W. R. Krigbaum et al., "Thermotropic homopolyesters: 5. Investigation of the smectic phase of polyesters based on p,p' -bibenzoic acid", Polymer, Oct. 1983, pp. 1299-1307, vol. 24.
D. Van Luyen, et al., "Influence de la Structure Sur Les Proprietes Mesomorphes des Polyesters—II" European Polymer Journal, pp. 303-306, 1980, vol. 16.
G. Maret, et al., "Orientation of Thermotropic Liquid-Crystalline Polyesters in High Magnetic Fields", Mol. Cryst. Liq. Cryst., 1982, pp. 295-309, vol. 88.
Masatoshi Tokita, et al., "Chain-Folded Lamellar Structure in the Smectic H Phase of a Main-Chain Polyester", Macromolecules, 1998, pp. 8590-8594, vol. 31.
Junji Watanabe, et al., "Crystalline and Liquid Crystal Transitions of Mesogenic Polymer Mixtures and Random Copolymers", Macromolecules, 1984, pp. 2288-2295, vol. 17.
Notification of Transmittal of Translation of the International Preliminary Report on Patentability (Form PCT/IB/338) of International Application No. PCT/JP2009/005700 mailed Jul. 7, 2011 with Form PCT/IPEA/409 (8 pages).
International Search Report of PCT/JP2010/057390, mailing date Jul. 13, 2010 (2 pages).
Notification of Transmittal of Translation of the International Preliminary Report on Patentability (Form PCT/IB/338) of International Application No. PCT/JP2010/057390 mailed Apr. 19, 2012 with Forms PCT/IB/373 and PCT/ISA/237 (9 pages).
International Search Report of PCT/JP2011/002212, date of mailing Jul. 19, 2011.
Asrar, J et al., "Thermotropic Homopolyesters. I. The Preparation and Properties of Polymers Based on 4, 4'- Dihydroxybiphenyl", Journal of Polymer Science: Polymer Physics Edition, vol. 21, p. 1119-1131 (1983)(13 pages).
Martinez-Gomez, A. et al., "Effect of the intercalated/exfoliated nanostructure on the phase transformations of smectic polyester/ layered silicate hybrids: Reinforcement of the liquid-crystalline matrix", Polymer, vol. 50, No. 6, p. 1447-1455 (2009)(9 pages).
Yoshihara, S. et al., "Enhanced Thermal Conductivity of Thermoplastics by Lamellar Crystal Alignment of Polymer Matrices", Macromolecular Chemistry and Physics, p. 1-7, Aug. 30, 2012 (7 pages).
Yoshihara, S. et al., "Lamellar Crystal Alignment of Main Chain Liquid Crystal Polyester and Thermal Conductivity", p. 1, May 15, 2012 (1 page).
Yoshihara, S. et al., "New Thermally Conductive Thermoplastic Liquid Crystal Polyester", p. 1-2, Aug. 29, 2012 (2 pages).
Notification of Transmittal of Translation of the International Preliminary Report on Patentability (Form PCT/IB/338) of International Patent Application No. PCT/JP2011/002212, dated Nov. 15, 2012, with Forms PCT/IB/373 and PCT/ISA/237(6 pages).
Notification of Transmittal of Translation of the International Preliminary Report on Patentability (Form PCT/IB/338) of International Patent Application No. PCT/JP2011/002208, dated Nov. 15, 2012, with Forms PCT/IB/373 and PCT/ISA/237 (6 pages).
International Search Report of PCT/JP2011/002208, dated Jul. 26, 2011 (5 pages).
US Non-Final Office Action dated May 8, 2013, issued in Related U.S. Appl. No. 13/395,914 (22 pages).
US Election/Restriction dated Mar. 11, 2013, issued in Related U.S. Appl. No. 13/395,914 (9 pages).
U.S. Notice of Allowance dated May 13, 2013, issued in Related U.S. Appl. No. 13/641,939 (16 pages).
U.S. Notice of Allowance dated Aug. 22, 2013, issued in Related U.S. Appl. No. 13/641,939 (16 pages).
Related U.S. Appl. No. 13/641,964.
Chinese Office Action dated Oct. 10, 2013, issued in corresponding Chinese Patent Application No. 201180019737.2 (5 pages).
Chinese Office Action dated Oct. 10, 2013, issued in corresponding Chinese Patent Application No. 201180019698.6 (5 pages).
U.S. Office Action dated Jan. 8, 2014, issued in related U.S. Appl. No. 13/395,914 (19 pages).
Paci et al., "Calorimetric Study of Blends of Poly(Butylene Terephthalate) and a Liquid Crystalline Polyester", Journal of Polymer Science: Part B: Polymer Physics, vol. 25, (1987), pp. 1595-1605, cited in U.S. Office Action dated Jan. 8, 2014 issued in related U.S. Appl. No. 13/395,914.
CAPlus abstract of Paci ("Calorimetric Study of Blends of Poly(Butylene Terephthalate) and a Liquid Crystalline Polyester", Journal of Polymer Science: Part B: Polymer Physics, vol. 25, (1987) pp. 1595-1605) and a Registry entry for RN 70800-12-3, (4 pages), cited in U.S. Office Action dated Jan. 8, 2014 issued in related U.S. Appl. No. 13/395,914.
CAPlus abstract of Paci ("alorimetric Study of Blends of Poly(Butylene Terephthalate) and a Liquid Crystalline Polyester", Journal of Polymer Science: Part B: Polymer Physics, vol. 285, (1987) pp. 1595-1605) and a Registry entry for RN 70800-12-3, (4 pages), cited in U.S. Office Action dated Jan. 8, 2014 issued in related U.S. Appl. No. 13/395,914.
U.S. Office Action dated Apr. 11, 2014, issued in related U.S. Appl. No. 13/641,964 (42 pages).
Japanese Office Action dated Jun. 3, 2014, issued in Japanese Patent Application No. 2011-531816 (3 pages) (this doccument is corresponding to U.S. Appl. No. 13/395,914).
U.S. Final Office Action dated Jun. 4, 2014, issued in related U.S. Appl. No. 13/395,914 (23 pages).
Advisory Action dated Aug. 21, 2014 issued in related U.S. Appl. No. 13/395,914 (7 pages).

* cited by examiner

HIGHLY THERMALLY CONDUCTIVE THERMOPLASTIC RESIN COMPOSITION AND THERMOPLASTIC RESIN

TECHNICAL FIELD

The present invention relates to a thermoplastic resin and a thermoplastic resin composition each of which is a highly thermally conductive heat radiating material and is applicable to, for example, injection molding.

BACKGROUND ART

In a case where a thermoplastic resin composition is used for various applications such as housings of a personal computer and a display device, an electronic device material, automotive exterior and interior parts, and the like, there sometimes occurs a problem that it is difficult to release generated heat because a thermoplastic resin composition is less thermally conductive than an inorganic substance such as a metal material. In order to solve the problem, an attempt has been extensively made to obtain a highly thermally conductive resin composition by blending, with a thermoplastic resin, a highly thermally conductive inorganic compound in a large amount. In order to obtain a highly thermally conductive resin composition, it is necessary to blend, with a resin, a highly thermally conductive inorganic compound such as graphite, carbon fiber, alumina, or boron nitride generally in an amount of not less than 30 vol % and further in an amount of as many as not less than 50 vol %. However, a resin, with which a highly thermally conductive inorganic compound is blended in a large amount, cannot be molded by use of a general-purpose mold. Therefore, in order to reduce an amount of highly thermally conductive inorganic compound to be blended with a resin, the resin itself is required to be more thermally conductive.

From such a viewpoint, an object to achieve a highly thermally conductive organic material is extremely important. Japanese Patent Application Publication, Tokukaisho, No. 61-296068 A (1986) discloses, as a method for achieving a highly thermally conductive organic material, a plastic compound which is filled with extremely highly oriented polymer fibers and is highly thermally conductive. This employs a characteristic such that extremely highly oriented polymer fibers disclosed in POLYMER, Vol. 19, P 155 (1978) have a higher thermal conductivity in their fiber axis direction.

However, extremely highly oriented polymer fibers have a lower thermal conductivity in a direction perpendicular to their fiber axis direction. Therefore, even random dispersion of such extremely highly oriented polymer fibers into an organic insulating composition causes less improvement in their thermal conductivity.

As described earlier, an orientation of polymer fibers in an organic insulating composition in one direction makes it possible to obtain an organic insulating material which is highly thermally conductive in the direction in which the polymer fibers are oriented. However, on the contrary, there is a problem that the organic insulating material is less thermally conductive in a direction other than the direction in which the polymer fibers are oriented.

ADVANCED MATERIALS, Vol. 5, P107 (1993) and Specification of German Patent Application Publication No. 4226994 describe that a monomer such as diacrylate which contains a mesogenic group is oriented in a given direction and then subjected to a cross-linking reaction, so as to obtain an anisotropic material which has a higher thermal conductivity in an in-plane direction of a film in which molecular chains are oriented. However, the anisotropic material has a low thermal conductivity in a direction other than the in-plane direction, especially in a thickness direction of the film.

In general, there are overwhelmingly many cases where a film material is employed so that heat is transferred in a thickness direction thereof. Therefore, a material whose thermal conductivity is low in a film thickness direction is less effective in thermal conduction.

On the other hand, a method for orienting molecular chains in a thickness direction also has been studied. Japanese Patent Application Publication, Tokukaihei, No. 1-149303 A (1989), Japanese Patent Application Publication, Tokukaihei, No. 2-5307 A (1990), Japanese Patent Application Publication, Tokukaihei, No. 2-28352 A (1990), and Japanese Patent Application Publication, Tokukaihei, No. 2-127438 A (1990) describe methods for producing an organic material such as polyoxymethylene or polyimide while applying an electrostatic pressure.

Japanese Patent Application Publication, Tokukaisho, No. 63-264828 A (1988) describes a material obtained as follows: Sheets in each of which molecular chains of polypropylene, polyethylene, or the like are arranged are adhered to be laminated with each other so that orientation directions of the molecular chains are aligned with each other. Then, the laminated sheets are thinly sliced in a perpendicular direction to the direction in which the molecular chains are arranged, so as to obtain the material in which the molecular chains are arranged in the perpendicular direction. It is true that such a method makes it possible to obtain a material which has a higher thermal conductivity in a film thickness direction. However, molding of such a material is extremely complicated and thus such a material is limited in use.

Epoxy resins described in Japanese Patent Application Publication, Tokukai, No. 2003-268070 A and Pamphlet of International Patent Application Publication No. 2002/094905 or bismaleimide resins described in Japanese Patent Application Publication, Tokukai, No. 2007-224060 A and Pamphlet of International Patent Application Publication No. 2006/120993 are thermally conductive to some extent but have a disadvantage in that they have complicated molecular structures difficult to produce.

A thermoplastic resin is exemplified by a resin molded article described in Japanese Patent Application Publication, Tokukai, No. 2008-150525 A. The resin molded article is obtained as follows: Thermal liquid crystal polyester is oriented by at least one external field selected from a flow field, a shear field, a magnetic field, and an electric field, so as to cause the thermal liquid crystal polyester to be highly thermally conductive in a direction in which the thermal liquid crystal polyester is oriented. The resin molded article is highly thermally conductive in one axis direction but less thermally conductive in the other two axis directions. In addition, in the case of the magnetic field, not less than 3 teslas of magnetic flux density is required to obtain a desired thermal conductivity. This makes it difficult to produce the resin molded article.

There have been no other examples of research report on a thermoplastic resin which is not subjected to a special molding process such as extension or magnetic field orientation and in which a resin per se is highly thermally conductive. As for a liquid crystalline thermoplastic resin, Non Patent Literatures 3 through 7 describe alternating polycondensation products of mesogenic groups and alkyl chains which alternating polycondensation products show liquid crystal phases. However, as for thermal conductivities of such polymers, none of the Non Patent Literatures describe the technique of obtaining a resin molded composition by blending, with a resin, another blended substance such as an inorganic filler.

CITATION LIST

Patent Literature 1
Japanese Patent Application Publication, Tokukaisho, No. 61-296068 A (1986)
Patent Literature 2
Specification of German Patent Application Publication No. 4226994
Patent Literature 3
Japanese Patent Application Publication, Tokukaihei, No. 1-149303 A (1989)
Patent Literature 4
Japanese Patent Application Publication, Tokukaihei, No. 2-5307 A (1990)
Patent Literature 5
Japanese Patent Application Publication, Tokukaihei, No. 2-28352 A (1990)
Patent Literature 6
Japanese Patent Application Publication, Tokukaihei, No. 2-127438 A (1990)
Patent Literature 7
Japanese Patent Application Publication, Tokukaisho, No. 63-264828 A (1988)
Patent Literature 8
Japanese Patent Application Publication, Tokukai, No. 2003-268070 A
Patent Literature 9
Pamphlet of International Patent Application Publication No. 2002/094905
Patent Literature 10
Japanese Patent Application Publication, Tokukai, No. 2007-224060 A
Patent Literature 11
Pamphlet of International Patent Application Publication No. 2006/120993
Patent Literature 12
Japanese Patent Application Publication, Tokukai, No. 2008-150525 A
Non Patent Literature 1
POLYMER, Vol. 19, P 155 (1978)
Non Patent Literature 2
ADVANCED MATERIALS, Vol. 5, P 107 (1993)
Non Patent Literature 3
Macromolecules, vol. 17, P 2288 (1984)
Non Patent Literature 4
Polymer, vol 24, P 1299 (1983)
Non Patent Literature 5
Eur. Polym. J., vol 16, P 303 (1980)
Non Patent Literature 6
Mol. Cryst. Liq. Cryst., vol. 88, P 295 (1982)
Non Patent Literature 2
Macromolecules, Vol. 31, P 8590 (1998)

SUMMARY OF INVENTION

Technical Problem

An object of the present invention is to provide a thermoplastic resin composition and a thermoplastic resin each of which (i) is a thermoplastic resin having an excellent thermal conductivity, (ii) allows maintenance of a high thermal conductivity of a resin composition without the need of blending, with the thermoplastic resin, a highly thermally conductive inorganic compound in a large amount, and (iii) allows the resin composition to be injection-molded even by use of a general-purpose mold for injection molding.

Another object of the present invention is to provide a thermoplastic resin composition and a thermoplastic resin each of which is highly thermally conductive not only in one direction but also isotropically.

Solution to Problem

Inventors of the present invention have made the present invention by finding that a thermoplastic resin which has a specific high-order structure is highly thermally conductive.

In order to attain the objects, a thermoplastic resin composition according to the present invention contains:

an inorganic filler; and a thermoplastic resin whose main chain contains a repeating unit represented by the general formula (1):

-M-Sp-    ... (1)

wherein M represents a mesogenic group; and Sp represents a spacer.

The thermoplastic resin composition according to the present invention is preferably arranged such that the thermoplastic resin has a number average molecular weight of 3000 to 40000.

The thermoplastic resin composition according to the present invention is preferably arranged such that the thermoplastic resin has a density of not less than 1.1 g/cm$^3$.

The thermoplastic resin composition according to the present invention is preferably arranged such that the thermoplastic resin contains, in a resin component thereof, lamellar crystals in a ratio of not less than 10 vol % to the resin component.

The thermoplastic resin composition according to the present invention is preferably arranged such that the thermoplastic resin has a thermal conductivity of not less than 0.45 W/m·K.

The thermoplastic resin composition according to the present invention is preferably arranged such that the thermoplastic resin contains, in its main chain, a repeating unit represented by the general formula (2):

-A$^1$-x-A$^2$-y-R-z-    ... (2)

wherein each of A$^1$ and A$^2$ independently represents a substituent group selected from the group consisting of an aromatic group, a condensed aromatic group, an alicyclic group, and an alicyclic heterocyclic group; each of x, y, and z independently represents a direct bond, or a bivalent substituent group selected from the group consisting of —CH$_2$—, —C(CH$_3$)$_2$—, —O—, —S—, —CH$_2$—CH$_2$—, —C═C—, —C≡C—, —CO—, —CO—O—, —CO—NH—, —CH═N—, —CH═N—N═CH—, —N═N—, and —N(O)═N—; and R represents a bivalent substituent group which has a main chain length of 2 to 20 atoms and may be branched.

The thermoplastic resin composition according to the present invention is preferably arranged such that a part of the thermoplastic resin which part corresponds to -A$^1$-x-A$^2$- is a mesogenic group represented by the general formula (3):

[Chem. 1]

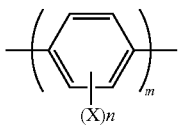

(3)

wherein X independently represents an aliphatic hydrocarbon group, F, Cl, Br, I, CN, or $NO_2$; n represents an integer of 0 to 4; and m represents an integer of 2 to 4.

The thermoplastic resin composition according to the present invention is preferably arranged such that R is a linear aliphatic hydrocarbon chain.

The thermoplastic resin composition according to the present invention is preferably arranged such that R has a main chain length of even-numbered carbon atoms.

The thermoplastic resin composition according to the present invention is preferably arranged such that R contains at least one kind of repeating unit which is selected from the group consisting of —$(CH_2)_8$—, —$(CH_2)_{10}$—, and —$(CH_2)_{12}$— and is represented by the general formula (2).

The thermoplastic resin composition according to the present invention is preferably arranged such that -y-R-z- is —O—CO—R—CO—O—.

The thermoplastic resin composition according to the present invention is preferably arranged such that the inorganic filler is at least one kind of highly thermally conductive inorganic compound selected from the group consisting of graphite, conductive metal powder, soft magnetic ferrite, carbon fiber, conductive metal fiber, zinc oxide, and carbon nanotube.

The thermoplastic resin composition according to the present invention is preferably arranged such that the inorganic filler is an electrically insulative thermally conductive inorganic compound which itself has a thermal conductivity of not less than 20 W/m·K.

The thermoplastic resin composition according to the present invention is preferably arranged such that the inorganic filler is at least one kind of electrically insulative thermally conductive inorganic compound selected from the group consisting of boron nitride, aluminum nitride, silicon nitride, aluminum oxide, magnesium oxide, magnesium carbonate, aluminum hydroxide, magnesium hydroxide, beryllium oxide, and diamond.

The thermoplastic resin composition according to the present invention is preferably arranged such that the inorganic filler is an inorganic nitride and the thermoplastic resin composition has a thermal conductivity of not less than 2.0 W/m·K and not more than 50 W/m·K.

The thermoplastic resin composition according to the present invention is preferably arranged such that the inorganic filler is a conductive carbon material and the thermoplastic resin composition has a thermal conductivity of not less than 5 W/m·K and not more than 120 W/m·K.

The thermoplastic resin composition according to the present invention is preferably arranged such that the inorganic filler is a fibrous filler and the thermoplastic resin composition has a thermal conductivity of not less than 0.45 W/m·K.

In order to attain the objects, a thermoplastic resin according to the present invention contains: in its main chain, a repeating unit represented by the general formula (1):

-M-Sp- ... (1)

wherein M represents a mesogenic group; and Sp represents a spacer, the thermoplastic resin containing, in a resin component thereof, lamellar crystals in a ratio of not less than 10 vol % to the resin component.

The thermoplastic resin according to the present invention is preferably arranged such that the thermoplastic resin has a number average molecular weight of 3000 to 40000.

The thermoplastic resin according to the present invention is preferably arranged such that the thermoplastic resin has a density of not less than 1.1 g/cm³.

The thermoplastic resin according to the present invention is preferably arranged such that the thermoplastic resin has a thermal conductivity of not less than 0.45 W/m·K.

The thermoplastic resin according to the present invention is preferably arranged such that the thermoplastic resin contains, in its main chain, a repeating unit represented by the general formula (2):

-A¹-x-A²-y-R-z- ... (2)

wherein each of A¹ and A² independently represents a substituent group selected from the group consisting of an aromatic group, a condensed aromatic group, an alicyclic group, and an alicyclic heterocyclic group; each of x, y, and z independently represents a direct bond, or a bivalent substituent group selected from the group consisting of —$CH_2$—, —$C(CH_3)_2$—, —O—, —S—, —$CH_2$—$CH_2$—, —C≡C—, —C=C—, —CO—, —CO—O—, —CO—NH—, —CH=N—, —CH=N—N=CH—, —N=N—, and —N(O)=N—; and R represents a bivalent substituent group which has a main chain length of 2 to 20 atoms and may be branched.

The thermoplastic resin according to the present invention is preferably arranged such that a part of the thermoplastic resin which part corresponds to -A¹-x-A²- is a mesogenic group represented by the general formula (3):

[Chem. 2]

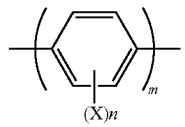

(3)

wherein X independently represents an aliphatic hydrocarbon group, F, Cl, Br, I, CN, or $NO_2$; n represents an integer of 0 to 4; and m represents an integer of 2 to 4.

The thermoplastic resin according to the present invention is preferably arranged such that R is a linear aliphatic hydrocarbon chain.

The thermoplastic resin according to the present invention is preferably arranged such that R has a main chain length of even-numbered carbon atoms.

The thermoplastic resin according to the present invention is preferably arranged such that R contains at least one kind of repeating unit which is selected from the group consisting of —$(CH_2)_8$—, —$(CH_2)_{10}$—, and —$(CH_2)_{12}$— and is represented by the general formula (2).

The thermoplastic resin according to the present invention is preferably arranged such that -y-R-z- is —O—CO—R—CO—O—.

Advantageous Effects of Invention

A thermoplastic resin according to the present invention (i) has an excellent thermal conductivity, (ii) allows maintenance of a high thermal conductivity of a resin composition without the need of blending, with the thermoplastic resin, a highly thermally conductive inorganic compound in a large amount, and (iii) allows the resin composition to be injection-molded even by use of a general-purpose mold for injection molding. Further, the resin composition has a physical property of being highly thermally conductive not only in one direction but also isotropically. A thermoplastic resin composition according to the present invention contains a thermally conductive resin as mentioned above and an inorganic filler, so as to be highly thermally conductive in various directions and also to be excellent in moldability.

For a fuller understanding of the nature and advantages of the invention, reference should be made to the ensuing detailed description taken in conjunction with the accompanying drawings.

DESCRIPTION OF EMBODIMENTS

A thermoplastic resin according to the present invention is described below. Thermoplasticity referred to in the present invention is a property of being plasticized by heating. Note that, since the thermoplastic resin according to the present invention has a property of forming a liquid crystal phase, the thermoplastic resin can also be referred to as a liquid crystalline thermoplastic resin.

A lamellar crystal referred to in the present invention correspond to a plate crystal in which long chain molecules are folded so as to be juxtaposed to each other. It is easily determine, by transmission electron microscopic (TEM) observation or X-ray diffraction, whether or not such a crystal is contained in a resin.

A ratio of lamellar crystals having such a continuous layer structure to a resin can be found by directly observing, by a transmission electron microscope (TEM), a sample dyed with $RuO_4$. Specifically, the ratio of lamellar crystals can be found by using, as a sample for TEM observation, an ultrathin slice which has a thickness of 0.1 μm and has been prepared by a microtome after cutting out a part of a molded sample (6 mm in thickness×Φ20 mm) and dying the part with $RuO_4$. The ultrathin slice thus prepared is observed by TEM at an acceleration voltage of 100 kV, so as to obtain a photograph with a 40,000×scale (20 cm×25 cm). The photograph allows determination of a lamellar crystal region. A boundary of the lamellar crystal region can be determined assuming that the lamellar crystal region is a region in which a periodic change occurs. Because lamellar crystals are distributed also in a thickness direction, the ratio of lamellar crystals is found as a ratio of the lamellar crystal region to a total area of the photograph. In order to cause a resin itself to be highly thermally conductive, the ratio of lamellar crystals is not less than 10 vol %. The ratio of lamellar crystals is preferably not less than 20 vol %, more preferably not less than 30 vol %, and particularly preferably not less than 40 vol %.

In order to cause a resin itself to be highly thermally conductive, not only the resin contains lamellar crystals but also the resin has a density preferably of not less than 1.1 g/cm³, more preferably of not less than 1.13 g/cm³, and particularly preferably of not less than 1.16 g/cm³.

A thermoplastic resin according to the present invention contains, in its main chain, a repeating unit represented by the general formula (1):

-M-Sp-        ... (1)

wherein M represents a mesogenic group; and Sp represents a spacer.

More specifically, the thermoplastic resin can be represented by the general formula (2):

-A¹-x-A²-y-R-z-        ... (2)

A mesogenic group contained in the thermoplastic resin of the present invention refers to a substituent group which is rigid and highly-oriented. A preferable mesogenic group is exemplified by a group represented by the general formula (5):

-A¹-x-A²-        ... (5)

wherein each of A¹ and A² independently represents a substituent group selected from the group consisting of an aromatic group, a condensed aromatic group, an alicyclic group, and an alicyclic heterocyclic group, x represents a direct bond, or a bivalent substituent group selected from the group consisting of —CH₂—, —C(CH₃)₂—, —O—, —S—, —CH₂—CH₂—, —C=C—, —C≡C—, —CO—, —CO—O—, —CO—NH—, —CH=N—, —CH=N—N=CH—, —N=N—, and —N(O)=N—.

Specific Examples of A¹ and A² include: phenylene, biphenylene, naphthylene, anthracenylene, cyclohexyl, pyridyl, pyrimidyl, and thiophenylene. A¹ and A² can be non-substituted or a derivative which contains a substituent group such as an aliphatic hydrocarbon group, a halogen group, a cyano group, or a nitro group. x is a connector and represents a direct bond, or a bivalent substituent group selected from the group consisting of —CH₂—, —C(CH₃)₂—, —O—, —S—, —CH₂—CH₂—, —C=C—, —CO—, —CO—O—, —CO—NH—, —CH=N—, —CH=N—N=CH—, —N=N—, and —N(O)=N—. Of these bivalent substituent groups, a bivalent substituent group is preferable in which x, which corresponds to the connector, has a main chain length of even-numbered atoms. Namely, a bivalent substituent group is preferable which is selected from the group consisting of —CH₂—CH₂—, —C=C—, —CO—O—, —CO—NH—, —CH=N—, —CH=N—N=CH—, —N=N—, and —N(O)=N—. In a case where x has a main chain length of odd-numbered atoms, the thermoplastic resin is more flexible due to an increase in molecular width of the mesogenic group and an increase in degree of freedom of bond rotation. This urges a decrease in crystallinity and would cause a decrease in thermal conductivity of resin per se.

Specific examples of such a preferable mesogenic group include: biphenyl, terphenyl, quarterphenyl, stilbene, diphenyl ether, 1,2-diphenylethylene, diphenylacetylene, benzophenone, phenylbenzoate, phenylbenzamide, azobenzene, 2-naphtoate, phenyl-2-naphtoate, and bivalent groups which have a structure in which two hydrogens are removed from a derivative or the like of such a mesogenic group as mentioned above. However, a preferable mesogenic group is not limited to these.

A more preferable mesogenic group is a mesogenic group represented by the general formula (3). This mesogenic group is rigid and highly-oriented due to its structure, and can also be easily available or synthesized.

[Chem. 3]

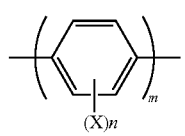

(3)

wherein X independently represents an aliphatic hydrocarbon group, F, Cl, Br, I, CN, or $NO_2$; n represents an integer of 0 to 4; and m represents an integer of 2 to 4.

In order to obtain a thermoplastic resin composition which has an excellent moldability, it is preferable that a mesogenic group contained in a thermoplastic resin contain no cross-linking substituent group.

A spacer contained in a thermoplastic resin refers to a flexible molecular chain. The spacer contained in the thermoplastic resin preferably has a main chain length of 4 to 28 atoms, more preferably of 6 to 24 atoms, and still more preferably of 8 to 20 atoms. In the case of a spacer whose main chain length is 4 or less atoms, a molecular structure of the thermoplastic resin is insufficiently flexible. This would cause the thermoplastic resin to be less crystalline and less thermally conductive. A spacer whose main chain length is 29 or more atoms would cause the thermoplastic resin to be less crystalline and less thermally conductive. A kind of atom constituting the main chain of the spacer is not particularly limited and any atom is applicable. The atom constituting the main chain of the spacer is preferably at least one kind of atom selected from C, H, O, S, and N.

The spacer may be saturated or unsaturated, but a saturated spacer is more preferable. The spacer which contains an unsaturated bond is insufficiently flexible. This would cause the thermoplastic resin to be less thermally conductive.

A preferable spacer is exemplified by a group represented by the general formula (6) of the general formula (2):

$$\text{-y-R-z-} \quad \ldots (6)$$

wherein each of y and z independently represents a direct bond, a bivalent substituent group selected from the group consisting of —$CH_2$—, —$C(CH_3)_2$—, —O—, —S—, —$CH_2$—$CH_2$—, —C=C—, —C≡C—, —CO—, —CO—O—, —CO—NH—, —CH=N—, —CH=N—N=CH—, —N=N—, and —N(O)=N—; and R represents a bivalent substituent group whose main chain length is 2 to 20 atoms and which may be branched. The spacer is specifically exemplified by an aliphatic hydrocarbon chain, a polyether chain, or the like. R is preferably a linear aliphatic hydrocarbon chain which is not branched. R which is branched urges the thermoplastic resin to be less crystalline and would cause a decrease in thermal conductivity of resin per se. R may be saturated or unsaturated, but is preferably saturated. R which contains an unsaturated bond is insufficiently flexible. This would cause the thermoplastic resin to be less thermally conductive. R is preferably a linear saturated aliphatic hydrocarbon chain which has 2 to 20 carbon atoms, more preferably a linear saturated aliphatic hydrocarbon chain which has 4 to 18 carbon atoms, and still more preferably a linear saturated aliphatic hydrocarbon chain which has 6 to 16 carbon atoms. Further, R preferably has a main chain length of even-numbered carbon atoms. R which has a main chain length of odd-numbered carbon atoms causes the mesogenic group to be tilted. This would cause the thermoplastic resin to be less crystalline and less thermally conductive. In particular, for the sake of obtaining a resin with an excellent thermal conductivity, R is preferably one kind selected from —$(CH_2)_8$—, —$(CH_2)_{10}$—, and —$(CH_2)_{12}$—. The thermoplastic resin according to the present invention can be arranged such that R contains a different repeating unit represented by the general formula (2). Namely, R can contain at least one kind of repeating unit which is selected from the group consisting of —$(CH_2)_8$—, —$(CH_2)_{10}$—, and —$(CH_2)_{12}$— and is represented by the general formula (2). As described earlier, R which contains a different repeating unit allows a greater variety of thermoplastic resin.

y and z are groups for bonding the substituent group R with the mesogenic group. Of spacers containing such groups, —CO—O—R—O—CO— and —O—CO—R—CO—O— are preferable, and —O—CO—R—CO—O— is particularly preferable for the sake of obtaining a resin with an excellent thermal conductivity.

The thermoplastic resin according to the present invention can be produced by any publicly-known method. For simple and easy structural control, the thermoplastic resin is preferably produced by reacting (i) a compound in which the mesogenic group has reactive functional groups at both ends thereof with (ii) a compound in which the substituent group R has reactive functional groups at both ends thereof. Examples of such a reactive functional group include publicly-known groups such as a hydroxyl group, a carboxyl group, an alkoxy group, an amino group, a vinyl group, an epoxy group, and a cyano group. A requirement under which such groups react with each other is not particularly limited. For simple and easy synthesis, the thermoplastic resin is preferably produced by reacting (i) a compound in which the mesogenic group has hydroxyl groups at both ends thereof with (ii) a compound in which the substituent group R has carboxyl groups at both ends thereof. Alternatively, the thermoplastic resin is preferably produced by reacting (i) a compound in which the mesogenic group has carboxyl groups at both ends thereof with (ii) a compound in which the substituent group R has hydroxyl groups at both ends thereof.

The following explains one example of a production method for producing the thermoplastic resin which contains (i) the compound in which the mesogenic group has hydroxyl groups at both ends thereof and (ii) the compound in which the substituent group R has carboxyl groups at both ends thereof. The mesogenic group which has hydroxyl groups at both ends thereof is reacted with a lower fatty acid such as acetic anhydride, thereby converting the hydroxyl groups to ester acetate individually or at one time. Thereafter, the resultant is subjected to a polycondensation reaction for acetic acid elimination with (ii) the compound in which the substituent group R has carboxyl groups at both ends thereof. The former reaction and the latter reaction may be carried out in one reaction vessel or in different reaction vessels. The polycondensation reaction is carried out substantinally in the presence of no solvent, generally at a temperature in a range of 250° C. to 350° C., and preferably at a temperature in a range of 270° C. to 330° C., in the presence of an inert gas such as nitrogen, under an ordinary pressure or under a reduced pressure, for 0.5 hour to 5 hours. The polycondensation reaction progresses slowly at a reaction temperature lower than 250° C., whereas a side reaction such as degradation is likely to occur at a reaction temperature higher than 350° C. Many phases of reaction temperature can be employed. Alternatively, a reaction product may be immediately taken out and collected in its molten state while the reaction temperature is increasing or when the reaction temperature reaches its maximum. The thermoplastic resin thus obtained may be used as it is. Alternatively, the thermoplastic resin thus obtained may be used after an unreacted material is removed from the thermoplastic resin or the thermoplastic resin is subjected to solid phase polymerization so that the thermoplastic resin has a better physical property. The solid phase polymerization may be carried out as follows: The thermoplastic resin thus obtained is mechanically crushed into particles whose size is not more than 3 mm, and preferably not more than 1 mm. Then, the particles are preferably treated in a solid-phase state at a temperature in a range of 100° C. to 350° C. in an atmosphere of an inert gas such as nitrogen or under a reduced pressure for 1 hour to 20 hours. Polymer particles whose size is not less than 3 mm, which are insufficiently treated and cause a problem in terms of physical property, are not preferable. It is preferable to select a treatment temperature and a rate of temperature increase so as to prevent a fusion of thermally conductive resin particles.

The thermoplastic resin may be produced by use of a catalyst. For example, at least one kind of compound selected from various metal compounds or organic sulfonic acid compounds may be used as the catalyst in producing the thermoplastic resin by the method of the present invention. Examples of such a compound include:

compounds of stibium, titanium, germanium, tin, zinc, aluminum, magnesium, calcium, manganese, sodium, or cobalt. Examples of an organic sulfonic acid compound include: sulfosalicylic acid, antimony trioxide (CS), and o-sulfo anhydrous benzoic acid (OSB). In particular, CS and OSB are preferably used. The catalyst is used generally in $0.1 \times 10^{-2}$ wt % to $100 \times 10^{-2}$ wt %, preferably in $0.5 \times 10^{-2}$ wt % to $50 \times 10^{-2}$ wt %, and most preferably in $1 \times 10^{-2}$ wt % to $10 \times 10^{-2}$ wt % with respect to a total weight of the thermoplastic resin.

Examples of an acid anhydride of a lower fatty acid which acid anhydride is used to produce the thermoplastic resin of the present invention include: acid anhydrides of lower fatty acids having a chain length of 2 to 5 carbon atoms such as acetic anhydride, propionic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, butyric anhydride, isobutyric acid anhydride, valeric acid anhydride, and pivalic acid anhydride. In particular, acetic anhydride, propionic acid anhydride, and trichloroacetic acid anhydride are preferably used. An acid anhydride of a lower fatty acid is used in an equivalent weight of 1.01 time to 1.50 time, and preferably of 1.02 time to 1.2 time with respect to a total amount of hydroxyl groups contained in the mesogenic group to be used. The thermoplastic resin may be produced by another method for causing (i) a compound in which the mesogenic group has carboxyl groups at both ends thereof and (ii) a compound in which the substituent group R has hydroxyl groups at both ends thereof to react with each other. The another method is exemplified by a method described in Japanese Patent Application Publication, Tokukaihei, No. 2-258864 A in which method 4,4'-biphenyldicarboxylic acid dimethyl and aliphatic diol are dissolved to be polymerized.

A structure of an end of the thermoplastic resin according to the present invention is not particularly limited. However, for the sake of obtaining a resin suitable to be injection-molded, it is preferable that the end be terminated with a hydroxyl group, a carboxyl group, an ester group, an acyl group, an alkoxy group, or the like. In a case where the end is a highly reactive functional group such as an epoxy group or a maleimide group, the thermoplastic resin is thermosetting thereby being less injection moldable.

The thermoplastic resin of the present invention may be copolymerized with another monomer, provided that the thermoplastic resin still can yield its effect. Examples of the another monomer include: aromatic hydroxycarboxylic acid, aromatic dicarboxylic acid, aromatic diol, aromatic hydroxylamine, aromatic diamine, aromatic aminocarboxylic acid, a caprolactam type, a caprolactone type, aliphatic dicarboxylic acid, aliphatic diol, aliphatic diamine, alicyclic dicarboxylic acid, alicyclic diol, aromatic mercaptocarboxylic acid, aromatic dithiol, aromatic mercaptophenol, and the like.

Specific examples of the aromatic hydroxycarboxylic acid include: 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, and 4'-hydroxyphenyl-3-benzoic acid, each of which may or may not be substituted with an alkyl, alkoxy, or halogen.

Specific examples of the aromatic dicarboxylic acid include: terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4''-dicarboxyterphenyl, bis(4-carboxyphenyl)ether, bis(4-carboxyphenoxy)butane, bis(4-carboxyphenyl)ethane, bis(3-carboxyphenyl)ether, bis(3-carboxyphenyl)ethane, and the like, each of which may or may not be substituted with an alkyl, alkoxy, or halogen.

Specific examples of the aromatic diol include: hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ester, bis(4-hydroxyphenyl)ethane, 2,2'-dihydroxybinaphthyl, and the like, each of which may or may not be substituted with an alkyl, alkoxy, or halogen.

Specific examples of the aromatic hydroxylamine include: 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, and 2,2'-diaminobinaphthyl, each of which may or may not be substituted with an alkyl, alkoxy, or halogen.

Specific examples of the aromatic diamine and the aromatic aminocarboxylic acid include: 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenyl methane (methylenedianiline), 4,4'-diaminobiphenyl ether (oxydianiline), 4-aminobenzoic acid, 3-aminobenzoic acid, 6-amino-2-naphthoic acid, and 7-amino-2-naphthoic acid, each of which may or may not be substituted with an alkyl, alkoxy, or halogen.

Specific examples of the aliphatic dicarboxylic acid include: oxalic acid, malonic acid, succinic acid, glutaric acid, adipic acid, pimelic acid, suberic acid, azelaic acid, sebacic acid, dodecanedioic acid, tetradecanedioic acid, fumaric acid, and maleic acid.

Specific examples of the aliphatic diamine include: 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine.

Specific examples of the alicyclic dicarboxylic acid, the aliphatic diol, and the alicyclic diol include: linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, neopentyl glycol, and the like, and reactive derivatives of these diols.

Specific examples of the aromatic mercaptocarboxylic acid, the aromatic dithiol, and the aromatic mercaptophenol include: 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and the like, and reactive derivatives of these compounds.

The thermoplastic resin of the present invention may have a point (Tm) at which a transition from a solid phase to a liquid crystal phase occurs and a point (Ti) at which a transition from the liquid crystal phase to an isotropic phase occurs. Tm is preferably 150° C. to 300° C., and more preferably 170° C. to 280° C. The thermoplastic resin whose melting point is less than 150° C. is not preferable to be used in electronic parts in terms of thermal resistance. The thermoplastic resin whose melting point is more than 300° C. is difficult to be injection-molded. Use of the thermoplastic resin having such Tm makes it possible to obtain a thermoplastic resin composition which can be easily injection-molded even by use of a general-purpose mold.

Since the thermoplastic resin of the present invention is extremely highly symmetrical and has a structure in which rigid chains are bonded by a flexible chain, the thermoplastic resin of the present invention is such that molecules are highly oriented and a high-order structure is densely formed. Therefore, it is preferable that the thermoplastic resin of the present invention have an excellent thermal conductivity of not less than 0.45 W/(m·K). Use of the thermoplastic resin having a thermal conductivity of not less than 0.45 W/(m·K) makes it possible to produce a resin composition of a certain thermal conductivity by blending a smaller amount of a highly thermally conductive inorganic substance into the thermoplastic resin than in use of a thermoplastic resin having a lower thermal conductivity.

The thermoplastic resin of the present invention has a thermal conductivity preferably of not less than 0.6 W/(m·K), more preferably of not less than 0.8 W/(m·K), and particularly preferably of not less than 1.0 W/(m·K). An upper limit of the thermal conductivity of the thermoplastic resin is not particularly limited. It is preferable that the thermoplastic resin have a thermal conductivity as high as possible. In a case where the thermoplastic resin (i) has a melting point at which the thermoplastic resin can be injection-molded and (ii) is not subjected to physical treatments such as magnetic field application, voltage application, rubbing, and extension, the thermoplastic resin generally has a thermal conductivity preferably of 30 W/(m·K), and more preferably of 10 W/(m·K). The thermoplastic resin which has no repeating unit consisting of the mesogenic group and the spacer generally has a thermal conductivity of less than 0.45 W/(m·K) and is therefore not preferable.

Note that, though the thermoplastic resin according to the present invention is highly thermally conductive, the thermoplastic resin preferably has a thermal conductivity of not less than 0.45 W/(m·K) which thermal conductivity is measured by averaging anisotropies to directions of thermal conduction. Specifically, for example, a thermal conductivity of a disk-shaped sample (6 mm in thickness×Φ20 mm) into which the thermoplastic resin is molded is measured by a hot disk method.

The thermoplastic resin according to the present invention is also isotropically thermally conductive. A method for determining whether or not the thermoplastic resin is isotropically thermally conductive is exemplified by a method in which thermal conductivities in respective thickness and surface directions of a disk-shaped sample (1 mm in thickness× Φ25.4 mm) into which the thermoplastic resin is molded are separately measured by a Xe flash method. The thermoplastic resin according to the present invention is isotropically highly thermally conductive, and the thermal conductivities measured by the Xe flash method in the respective thickness and surface directions are not less than 0.3 W/(m·K).

A molded article has different thermal conductivities depending on crystallinity of the molded article which crystallinity is varied depending on molding conditions under which the molded article was molded. A melting temperature of the resin at the molding is preferably Tm+10° C. to 40° C. and not more than Ti, more preferably Tm+10° C. to 30° C., and still more preferably not more than Ti. In a case where the resin is melted at a temperature of not less than Ti, the molded article cannot have a higher crystallinity (a ratio of lamellar crystals to the resin decreases) since no molecular orientation occurs. This would cause a decrease in thermal conductivity of the molded article.

A number average molecular weight of the thermoplastic resin of the present invention refers to a value obtained as follows: Assuming that polystyrene is a reference material, the number average molecular weight is measured by GPC (Gel Permeation Chromatography) at 80° C. by use of a 0.25 wt % solution of the thermoplastic resin in a solvent of p-chlorophenol and o-dichlorobenzene mixed in a ratio of 1:2 (vol %). The thermoplastic resin of the present invention has a number average molecular weight preferably of 3000 to 40000. In view of an upper limit of the number average molecular weight, the thermoplastic resin has a number average molecular weight more preferably of 3000 to 30000, and particularly preferably of 3000 to 20000. In view of a lower limit of the number average molecular weight, the thermoplastic resin has a number average molecular weight preferably of 3000 to 40000, more preferably of 5000 to 40000, and particularly preferably of 7000 to 40000. In view of upper and lower limits of the number average molecular weight, the thermoplastic resin has a number average molecular weight more preferably of 5000 to 30000, and most preferably of 7000 to 20000. The thermoplastic resin which has a number average molecular weight of less than 3000 or more than 40000 but has an identical primary structure may have a thermal conductivity of less than 0.45 W/(m·K).

The thermoplastic resin of the present invention can be used as a highly thermally conductive thermoplastic resin composition (hereinafter appropriately abbreviated as a resin composition) by blending therewith a filler, another resin, or the like.

The resin composition of the present invention can contain an inorganic filler. The resin composition of the present invention contains the inorganic filler preferably in 10 parts by weight to 900 parts by weight, more preferably in 15 parts by weight to 650 parts by weight, and particularly preferably in 20 parts by weight to 400 parts by weight. The resin composition which contains the inorganic filler in less than 10 parts by weight would not be satisfactorily thermally conductive. In contrast, the resin composition which contains the inorganic filler in more than 900 parts by weight would have an insufficient mechanical property.

As described earlier, since the resin composition according to the present invention is highly thermally conductive while containing the inorganic filler in a small amount, the resin composition can be less dense. The resin composition which is highly thermally conductive and less dense is advantageous for use as a heat radiating or heat transmitting resin material for various fields such as electric, electronic, and automotive industries.

A publicly-known inorganic filler can be extensively used as the inorganic filler. A thermal conductivity of the inorganic filler itself is not particularly limited. The inorganic filler itself has a thermal conductivity preferably of not less than 0.5 W/m·K, and more preferably of not less than 1 W/m·K. From the viewpoint of excellence in thermal conductivity of a composition to be obtained, it is particularly preferable that the inorganic filler be a highly thermally conductive inorganic compound in which the inorganic filler itself has a thermal conductivity of not less than 10 W/m·K.

The highly thermally conductive inorganic compound is used which itself has a thermal conductivity preferably of not less than 12 W/m·K, more preferably of not less than 15 W/m·K, most preferably of not less than 20 W/m·K, and particularly preferably of not less than 30 W/m·K. An upper limit of the thermal conductivity of the highly thermally conductive inorganic compound itself is not particularly limited. It is preferable that the highly thermally conductive inorganic compound itself have a thermal conductivity as high as possible. The highly thermally conductive inorganic compound is generally used which itself has a thermal conductivity preferably of not more than 3000 W/m·K, and more preferably of not more than 2500 W/m·K.

In a case where the highly thermally conductive inorganic compound is used for an application in which an electric insulation property is not particularly required as a resin composition, a metal compound, a conductive carbon compound, or the like is preferably used. Of these compounds, conductive carbon materials such as graphite, carbon fiber, and carbon nanotube; conductive metal powder obtained by microparticulating various metals; conductive metal fiber obtained by fibrously processing various metals; and metal oxides such as ferrites and zinc oxide are preferably usable because they have excellent thermal conductivities.

The resin composition of the present invention which resin composition contains a conductive carbon material has a thermal conductivity generally of not less than 5 W/m·K and not more than 120 W/m·K, preferably of not less than 10 W/m·K and not more than 100 W/m·K, and more preferably of not less than 15 W/m·K and not more than 80 W/m·K. The thermal conductivity which falls within the foregoing range makes it possible to obtain a more preferable resin composition.

The resin composition of the present invention which resin composition contains a fibrous filler such as carbon fiber or conductive metal fiber obtained by fibrously processing various metals has a thermal conductivity generally of not less than 0.45 W/m·K, preferably of not less than 0.6 W/m·K and not more than 50 W/m·K, more preferably of not less than 0.8 W/m·K and not more than 45 W/m·K, and most preferably of not less than 1.0 W/m·K and not more than 40 W/m·K. The thermal conductivity which falls within the foregoing range makes it possible to obtain a more preferable resin composition.

In a case where the highly thermally conductive inorganic compound is used for an application in which an electric insulation property is required as a resin composition, a compound which has an electric insulation property is preferably used. Note that having an electric insulation property specifically means having an electric resistance of not less than 1 $\Omega$·cm. It is advantageous to use a compound which has an electric resistance preferably of not less than 1 $\Omega$·cm, more preferably of not less than $10^5$ $\Omega$·cm, still more preferably of not less than $10^{10}$ $\Omega$·cm, and most preferably of not less than $10^{13}$ $\Omega$·cm. An upper limit of the electric resistance is not particularly limited. A compound which has an electric resistance of not more than $10^{18}$ $\Omega$·cm is generally used. It is preferable that a molded article obtained from the highly thermally conductive resin composition of the present invention also have an electric insulation property falling within the above range.

Of the highly thermally conductive inorganic compounds, specific examples of the compound which has an electric insulation property include: metal oxides such as aluminum oxide, magnesium oxide, silicon oxide, beryllium oxide, copper oxide, and cuprous oxide; metal nitrides such as boron nitride, aluminum nitride, and silicon nitride; metal carbides such as silicon carbide; metal carbonates such as magnesium carbonate; insulating carbon materials such as diamond; and metal hydroxides such as aluminum hydroxide and magnesium hydrate.

In particular, metal nitrides such as boron nitride, aluminum nitride, and silicon nitride; metal oxides such as aluminum oxide, magnesium oxide, and beryllium oxide; metal carbonates such as magnesium carbonate; metal hydroxides such as aluminum hydroxide and magnesium hydroxide; and insulating carbon materials such as diamond are more preferably usable because they have excellent insulation properties. These compounds can be used alone or in combination of two or more kinds.

The resin composition of the present invention which resin composition contains an inorganic nitride such as a metal nitride as mentioned above has a thermal conductivity generally of not less than 2.0 W/m·K and not more than 50 W/m·K, preferably of not less than 2.1 W/m·K and not more than 45 W/m·K, and more preferably of not less than 2.5 W/m·K and not more than 40 W/m·K. The thermal conductivity which falls within the foregoing range makes it possible to obtain a more preferable resin composition.

The highly thermally conductive inorganic compounds can have various shapes. Examples of the various shapes include: particles, fine particles, nanoparticles, agglomerated particles, a tubular shape, a nanotubular shape, a wire shape, a rod shape, a needle shape, a plate shape, an amorphous shape, a rugby ball shape, a hexahedral shape, composite particles in which large particles and microparticles are mixed with each other, and a liquid. Note that these highly thermally conductive inorganic compounds may be natural products or synthetic products. In the case of natural products, at least where they are produced is not particularly limited and they can be appropriately selected. These highly thermally conductive inorganic compounds can be used alone or in combination of two or more kinds which are different in shape, average particle size, kind, surface treatment agent, and the like.

These highly thermally conductive inorganic compounds, which cause an increase in adhesiveness at an interface between a thermoplastic resin and an inorganic compound and facilitate workability, can be subjected to a surface treatment carried out by use of various surface treatment agents such as a silane treatment agent. A surface treatment agent is not particularly limited, and conventionally publicly-known surface treatment agents such as a silane coupling agent and a titanate coupling agent are usable. In particular, a silane coupling agent containing an epoxy group such as epoxy silane, a silane coupling agent containing an amino group such as aminosilane, and a polyoxyethylene silane coupling agent are preferable because they are less likely to cause a deterioration in properties of a resin. A method for carrying out a surface treatment with respect to an inorganic compound is not particularly limited, and a general surface treatment method can be employed.

Publicly-known organic and inorganic fillers other than the highly thermally conductive inorganic compound are extensively usable for the resin composition of the present invention according to need. Examples of a filler other than the highly thermally conductive inorganic compound include: diatomite powder; basic magnesium silicate; calcined clay; micronized silica; quartz powder; crystalline silica; kaolin;

talc; antimony trioxide; micronized mica; molybdenum disulfide; rock wool; ceramic fiber; inorganic fiber such as asbestos; paper, pulp, and wood material; synthetic fibers such as polyamide fiber, aramid fiber, and boron fiber; resin powder such as polyolefin powder; and glass fillers such as glass fiber, glass powder, glass cloth, and molten silica. Use of such a filler allows an increase in property such as thermal conductivity, mechanical strength, or abrasion resistance which is suitable for practical use of the resin composition. Of these fillers, from the viewpoint of excellence in strength, it is preferable to use an inorganic filler.

Further, according to need, an organic filler such as paper, pulp, and wood material; synthetic fibers such as polyamide fiber, aramid fiber, and boron fiber; and resin powder such as polyolefin powder can be blended in combination.

The thermoplastic resin and the resin composition of the present invention can contain any publicly-known resin such as epoxy resin, polyolefin resin, bismaleimide resin, polyimide resin, polyether resin, phenol resin, silicone resin, polycarbonate resin, polyamide resin, polyester resin, fluororesin, acrylic resin, melamine resin, urea resin, and urethane resin, provided that the thermoplastic resin and the resin composition continue to yield an effect of the present invention. Specific examples of a preferable resin include: polyethylene terephthalate, polybutylene terephthalate, a liquid crystal polymer, nylon 6, and nylon 6,6. Generally, a resin is preferably contained in 0 part by weight to 10000 parts by weight with respect to 100 parts by weight of the thermoplastic resin contained in the resin composition.

Further, according to need, any other component such as a reinforcer, a thickner, a mold release, a coupling agent, a flame retarder, a flame-resistant agent, a pigment, a coloring agent, and other auxiliary agents can be added to the thermoplastic resin and the resin composition of the present invention as an additive other than a resin and a filler which are mentioned above and can be added, provided that the thermoplastic resin and the resin composition continue to yield an effect of the present invention. Such an additive is preferably contained in 0 part by weight to 20 parts by weight in total with respect to 100 parts by weight of the thermoplastic resin.

A method for producing the thermoplastic resin composition of the present invention is not particularly limited. For example, the thermoplastic resin composition can be produced as follows: Components, an additive, and/or the like mentioned above are dried, so as to be subjected to melt-kneading by use of a melt-kneading machine such as a single screw extruder or a double screw extruder. Note that, in a case where a blended component is a liquid, it is also possible to produce the thermoplastic resin composition by adding, in the middle of the melt-kneading, the liquid into the melt-kneading machine by use of a liquid supply pump or the like.

A method for molding the thermoplastic resin composition of the present invention is not particularly limited. The thermoplastic resin composition can be molded by generally used thermoplastic resin molding methods such as injection molding, blow molding, extrusion molding, vacuum molding, press molding, and calendar molding. Of these methods, the thermoplastic resin composition is preferably molded by injection molding because (i) this method is excellent in productivity due to its short molding cycle, (ii) the resin composition of the present invention has a property of having a favorable liquidity while being injection-molded, and (iii) the like.

Since the resin composition obtained in the present invention has an excellent moldability, the resin composition can be molded by use of a plastic general molding machine such as an injection molding machine or an extrusion molding machine which is currently extensively used, and can also be easily molded into a product which has a complicated shape.

It is possible to extensively use a composite material (the molded article) thus obtained, in various forms such as a resin film, a resin molded article, a resin foam, a paint, and a coating agent, for various applications such as an electronic material, a magnetic material, a catalytic material, a structure material, an optical material, a medical material, an automotive material, and an architectural material. Since a general plastic injection molding machine such as injection molding machine or an extrusion molding machine which is currently extensively used is usable for the highly thermally conductive thermoplastic resin composition obtained in the present invention, the highly thermally conductive thermoplastic resin composition can be molded into a product which has a complicated shape. Particularly because the highly thermally conductive thermoplastic resin composition of the present invention has excellent properties of both remarkable molding workability and a high thermal conductivity, it is extremely useful as a thermally conductive material or a heat radiating material, especially as a resin for housings of a mobile phone, a display device, and a computer in each of which a heat source is provided.

The highly thermally conductive resin composition of the present invention is preferably usable for injection-molded articles of electric appliances, OA equipment parts, AV equipment parts, automotive exterior and interior parts, and the like. The highly thermally conductive resin composition of the present invention is particularly preferably usable as an exterior material in electric appliances and OA equipment in each of which a large amount of heat is generated. Further, in an electronic device in which a heating source is provided but it is difficult to cause a fan or the like to carry out forced cooling, the highly thermally conductive resin composition of the present invention is preferably usable as an exterior material of such an electronic device so that heat generated inside the electronic device is radiated to outside the electronic device. In particular, the highly thermally conductive resin composition of the present invention is extremely useful as a resin for cases, housings, or external materials preferably of a portable computer such as a laptop personal computer and small-sized or portable electronic devices such as a PDA, a mobile phone, a portable game machine, a portable music player, a portable TV/video device, and a portable video camera. Note that the highly thermally conductive resin composition of the present invention is also extremely useful as a resin for battery peripheral equipment of an automobile, an electric train, and the like, a resin for portable batteries of electric appliances, a resin for power distribution parts such as a breaker, a sealing material for a motor, and the like.

The highly thermally conductive resin composition of the present invention, in which thermally conductive resin composition the highly thermally conductive inorganic compound can be contained in a reduced amount, is more excellent in molding workability as compared to a conventionally well-known composition, and has properties useful as parts or housings for the foregoing applications.

EXAMPLES

The following description more specifically discusses the thermoplastic resin and the resin composition of the present invention with reference to Examples and Comparative Examples. The present invention is not limited only to the Examples. Note that reagents produced by Wako Pure Chemical Industries, Ltd. were used as reagents described below if not otherwise specified. Note that a thermoplastic resin can be produced with reference to Journal of Polymer Science: Polymer Physics Edition, Vol. 21, 1119-1131 (1983).

[Evaluation Method]

<Measurement of Thermophysical Property>

Thermophysical properties were measured by Differential Scanning calorimetry (Shimadzu Corporation; Shimadzu DSC-50) at a rate of temperature increase of 10° C./min, and a temperature at which a highest peak of heat absorption was obtained was assumed to be a melting point.

<Molding of Test Piece>

Obtained samples were dried and then molded into samples (6 mm in thickness×Φ20 mm) by an injection molding machine for measurement of thermal conductivities. Further, disk-shaped samples (1 mm in thickness×Φ25.4 mm) were molded for checking anisotropies of thermal conductivities of thin molded articles.

<TEM Observation>

Parts of the respective molded samples (6 mm in thickness×Φ20 mm) were cut out, so as to be dyed with $RuO_4$. Then, ultrathin slices which have a thickness of 0.1 μm were prepared by a microtome. The ultrathin slices thus prepared were observed by TEM at an acceleration voltage of 100 kV.

<Ratio of Lamellar Crystals>

A photograph with 40,000×scale (20 cm×25 cm) which photograph had been obtained by TEM observation was used to determine a lamellar crystal region. A boundary of the lamellar crystal region was determined assuming that the lamellar crystal region is a region in which a periodic change occurs. Given that lamellar crystals are distributed also in a thickness direction, the ratio of lamellar crystals to a resin was found as a ratio of the lamellar crystal region to a total area of the photograph.

<Thermal Conductivity>

Thermal conductivities of samples (6 mm in thickness x t 20 mm) were measured by use of a sensor of t 4 in a hot disk method thermal conductivity measuring device produced by KYOTO ELECTRONICS MANUFACTURING CO., LTD. The thermal conductivities thus measured were obtained by averaging anisotropies to directions of thermal conduction. A laser light absorbing spray (Blackguard spray FC-153, produced by Fine Chemical Japan Co., LTD.) was applied to surfaces of disk-shaped samples (1 mm in thickness×Φ25.4 mm), so that the disk-shaped samples were dried. Thereafter, thermal conductivities of the respective disk-shaped samples were measured in thickness and plane directions of the respective disk-shaped samples by use of a Xe flash analyzer LFA447 Nanoflash (produced by NETZSCH Inc.).

<Density>

Densities of disk-shaped samples (6 mm in thickness×Φ20 mm) were measured by an underwater substitution method.

<Measurement of Number Average Molecular Weight>

A sample solution was prepared by dissolving the thermoplastic resin of the present invention in a 1:2 (vol %) mixed solvent of p-chlorophenol and o-dichlorobenzene so that the sample solution has a concentration of 0.25 wt %. Polystyrene [sold by Chemco Scientific Co., Ltd.; molecular weight (Mw/Mn): 390,000(1.06), 200,000(1.06), 65,000(1.06), 30,000(1.06), 3,350(1.10), 1,241(1.07)] was used as a reference material, so as to prepare a similar sample solution. A number average molecular weight of the thermoplastic resin was measured by high-temperature GPC (150-CV, produced by Waters Corporation) under the conditions of INJECTOR COMP.: 80° C., COLUMN COMP.: 80° C., PUMP/SOLVENT COMP.: 60° C., Injection Volume: 200 μl, flow rate: 0.7 ml/min. A differential refractometer (RI) was used as a detector.

Two organic solvent GPC columns (HT-806M, produced by SHOWA DENKO K.K.; theoretical plate number: not less than 7,000; exclusion limit molecular weight: 20,000,000; particle size: 13 μm) were connected in series for use as a GPC column.

Example 1

4,4' dihydroxybiphenyl, sebacic acid, and acetic anhydride were placed in a molar ratio of 1:1.05:2.2 in a sealed reactor vessel provided with a reflux condenser, a thermometer, a nitrogen introduction tube, and a stirring rod. Antimony oxide was used as a catalyst, and the temperature was raised to a reflux temperature while the contents were being stirred in gentle nitrogen gas stream. After the contents were kept warm at the reflux temperature for 5 hours, the reflux condenser was replaced with a Liebig condenser. Then, acetic acid was distilled away while the temperature was being raised to 200° C. Further, the temperature was raised to 300° C. at a rate of 1° C/min, and polymerization was carried out for 1 hour and 30 minutes while acetic acid generated at 300° C. was being distilled away. When an amount of distillate acetic acid reached 90% of a theoretical yield of acetic acid, approximately 20 minutes were spent to decompress the vessel to not more than 0.5 torr with the temperature maintained at 300° C., so as to carry out melt polymerization until the polymer was grown to a high molecular weight. After one hour, the pressure inside the vessel was brought back to an ordinary pressure with an inert gas and then a generated polymer was collected. The polymer thus obtained was melted at 230° C., so as to obtain, by injection molding, (i) a sample (6mm in thickness ×Φ) 20mm) and (ii) a disk-shaped sample (1mm in thickness ×Φ25.4mm).

Example 2

4,4' dihydroxybiphenyl, sebacic acid, p-hydroxybenzoic acid, and acetic anhydride were placed in a molar ratio of 1:1:3.5:6 in a sealed reactor vessel provided with a reflux condenser, a thermometer, a nitrogen introduction tube, and a stirring rod. The temperature was raised to a reflux temperature while the contents were being stirred in gentle nitrogen gas stream. After the contents were kept warm at the reflux temperature for 5 hours, the reflux condenser was replaced with a Liebig condenser. Then, acetic acid was distilled away while the temperature was being raised to 200° C. Further, the temperature was raised to 320° C. at a rate of 1° C/min, and polymerization was carried out for 1 hour and 30 minutes while acetic acid generated at 320° C. was being distilled away. When an amount of distillate acetic acid reached 90% of a theoretical yield of acetic acid, approximately 20 minutes were spent to decompress the vessel to not more than 0.5 torr with the temperature maintained at 320° C., so as to carry out melt polymerization until the polymer was grown to a high molecular weight. After one hour, the pressure inside the vessel was brought back to an ordinary pressure with an inert gas and then a generated polymer was collected. The polymer thus obtained was melted at 230° C., so as to obtain, by injection molding, (i) a sample (6mm in thickness ×Φ20mm) and (ii) a disk-shaped sample (1mm in thickness ×Φ25.4mm). The polymer (thermoplastic resin) of this Example was obtained by copolymerizing p-hydroxybenzoic acid with the polymer (thermoplastic resin) of Example 1.

Comparative Example 1

The polymer synthesized in Example 1 was melted at 290° C. (a temperature of not less than Ti), so as to mold a sample (6 mm in thickness×Φ20 mm) by injection molding and to measure a thermal conductivity of the sample.

Comparative Examples 2 Through 4

Polyethylene (PE) (HI-ZEX, produced by Prime Polymer Co., Ltd.), polyethylene terephthalate (PET) (BELLPET EFG-70, produced by Bell Polyester Products, Inc.), each of which is a general-purpose resin, and a copolymer (LCP) (produced by Sigma-Aldrich Co.) of 80 wt % of polyethylene terephthalate and 20 wt % of p-hydroxybenzoic acid were molded into samples (6 mm in thickness×Φ20 mm) by an injection molding machine, so as to measure thermal conductivities of the respective samples.

Tables 1 and 2 show conditions for injection molding and properties of obtained molded articles for the resins of Examples 1 and 2 and Comparative Examples 1 through 4.

TABLE 1

|  |  | Ex. 1 | Ex. 2 |
|---|---|---|---|
| Tm (° C.) |  | 205 | 200 |
| Ti (° C.) |  | 280 | 320 |
| Melting Temperature during Injection Molding (° C.) |  | 225 | 235 |
| Ratio of Lamellar Crystals (%) |  | 60 | 33 |
| Density (g/cm$^3$) |  | 1.24 | 1.34 |
| Thermal Conductivity of 6 mm × 20 mm (W/m · K) |  | 0.60 | 0.55 |
| Thermal Conductivity of 1 mm × 25.4 mm (W/m · K) | Thickness Direction | 0.83 | 0.51 |
|  | Plane Direction | 0.73 | 0.82 |

TABLE 2

|  | Com. Ex. 1 | Com. Ex. 2 | Com. Ex. 3 | Com. Ex. 4 |
|---|---|---|---|---|
| Resin | Ex. 1 | PE | PET | LCP |
| Tm (° C.) | 205 | — | — | — |
| Ti (° C.) | 280 | 135 | 270 | — |
| Melting Temperature during Injection Molding (° C.) | 290 | 200 | 280 | 280 |
| Ratio of Lamellar Crystals (%) | 1.5 | 80 | 0 | 0 |
| Density (g/cm$^3$) | 1.22 | 0.95 | 1.35 | 1.38 |
| Thermal Conductivity of 6 mm × 20 mm (W/m · K) | 0.38 | 0.40 | 0.28 | 0.21 |

It is clear that the thermoplastic resins according to Examples 1 and 2 are extremely useful since the thermoplastic resins have thermal conductivities of not less than 0.45 W/m·K, the thermal conductivities being measured by the hot disk method (see Tables 1 and 2). Table 1 also shows that the thermoplastic resins according to Examples 1 and 2 are highly thermally conductive both in respective thickness and surface directions. In view of the above, it is clear that the thermoplastic resins according to Examples 1 and 2 are highly thermally conductive not only in one direction but also isotropically.

Further, according to Example 1 and Comparative Example 1, even in the case of a resin which has an identical primary structure, depending on a thermal history of the resin, a ratio of lamellar crystals to the resin greatly changes and a thermal conductivity of the resin changes.

Example 3

4,4' dihydroxybiphenyl, sebacic acid, and acetic anhydride were placed in a molar ratio of 1:1.05:2.1 in a sealed reactor vessel. An acetylated reaction was carried out under an ordinary pressure in an atmosphere of nitrogen gas at 150° C. for 3 hours. Then, polycondensation was conducted in the vessel heated to 280° C. at a rate of temperature increase of 1° C. /min. When an amount of distillate acetic acid reached 90% of a theoretical yield of acetic acid, approximately 20 minutes were spent to decompress the vessel to not more than 10 ton with the temperature maintained at 280° C., so as to carry out melt polymerization until the polymer was grown to a high molecular weight. One hour after the beginning of the decompression, the pressure inside the vessel was brought back to an ordinary pressure with an inert gas and then a generated polymer was collected. Table 3 shows a molecular structure of the thermoplastic resin of Example 3, and Table 4 shows (i) a number average molecular weight of the thermoplastic resin of Example 3 and (ii) a thermal conductivity of the thermoplastic resin itself.

Examples 4 and 5

In Examples 4 and 5, as in the case of Example 3, polymerization was carried out so as to synthesize resins which have different number average molecular weights, except that the polymerization time period from the beginning of the decompression in Example 3 was changed in Examples 4 and 5 to 1.5 hour and 3 hours, respectively. Table 3 shows molecular structures of the thermoplastic resins of respective Examples 4 and 5, and Table 4 shows (i) number average molecular weights of the thermoplastic resins of respective Examples 4 and 5 and (ii) thermal conductivities of the thermoplastic resins themselves.

Examples 6 Through 8

In Examples 6 through 8, as in the cases of Examples 3 through 5, polymerization was carried out so as to synthesize resins which have different number average molecular weights, except that sebacic acid used in each of Examples 3 through 5 was replaced with dodecanedioic acid. Table 3 shows molecular structures of the thermoplastic resins of respective Examples 6 through 8, and Table 4 shows (i) number average molecular weights of the thermoplastic resins of respective Examples 6 through 8 and (ii) thermal conductivities of the thermoplastic resins themselves.

Examples 9 Through 11

In Examples 9 through 11, as in the cases of Examples through 5, polymerization was carried out so as to synthesize resins which have different number average molecular weights, except that sebacic acid used in each of Examples 3 through 5 was replaced with tetradecanedioic acid. Table 3 shows molecular structures of the thermoplastic resins of respective Examples 9 through 11, and Table 4 shows (i) number average molecular weights of the thermoplastic resins of respective Examples 9 through 11 and (ii) thermal conductivities of the thermoplastic resins themselves.

Example 12

4,4'-biphenyldicarboxylic acid dimethyl and 1,10-decane diol were placed in a molar ratio of 1:1.05 in a polymerization reactor, and TBT (tetrabutyl titanate) was added as a catalyst in $5 \times 10^{-4}$ mol with respect to 1 mol of structural units of polyester, so as to distil methanol by carrying out an ester exchange reaction at 280° C. Then, a polycondensation reaction was carried out under a reduced pressure of 10 torr at a temperature of 280° C. for 1.5 hour. Thereafter, the pressure inside the reactor was brought back to an ordinary pressure with an inert gas and then a generated polymer was collected. Table 3 shows a molecular structure of the thermoplastic resin of Example 12, and Table 4 shows (i) a number average molecular weight of the thermoplastic resin of Example 12 and (ii) a thermal conductivity of the thermoplastic resin itself.

Example 13

In Example 13, polymerization was carried out as in the case of Example 12, except that 1,10-decane diol used in Example 12 was replaced with triethylene glycol. Table 3 shows a molecular structure of the thermoplastic resin of Example 13, and Table 4 shows (i) a number average molecular weight of the thermoplastic resin of Example 13 and (ii) a thermal conductivity of the thermoplastic resin itself.

Example 14

4-acetoxybenzoic acid-acetoxyphenyl and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to not more than 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 3 shows a molecular structure of the thermoplastic resin of Example 14, and Table 4 shows (i) a number average molecular weight of the thermoplastic resin of Example 14 and (ii) a thermal conductivity of the thermoplastic resin itself.

Example 15

4,4'-diacetoxyazoxybenzene and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to not more than 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 3 shows a molecular structure of the thermoplastic resin of Example 15, and Table 4 shows (i) a number average molecular weight of the thermoplastic resin of Example 15 and (ii) a thermal conductivity of the thermoplastic resin itself.

Comparative Examples 5 and 6

In Comparative Examples 5 and 6, as in the case of Example 3, polymerization was carried out so as to synthesize resins which have different number average molecular weights, except that the polymerization time period in which the decompression was carried out in Example 3 was changed in Comparative Examples 5 and 6 to 0 hour and 6 hours, respectively. Table 3 shows molecular structures of the thermoplastic resins of respective Comparative Examples 5 and 6, and Table 4 shows (i) number average molecular weights of the thermoplastic resins of respective Comparative Examples 5 and 6 and (ii) thermal conductivities of the thermoplastic resins themselves.

Comparative Examples 7 and 8

In Comparative Examples 7 and 8, as in the cases of Comparative Examples 5 and 6, polymerization was carried out so as to synthesize resins which have different number average molecular weights, except that sebacic acid used in each of Comparative Examples 5 and 6 was replaced with dodecanedioic acid. Table 3 shows molecular structures of the thermoplastic resins of respective Comparative Examples 7 and 8, and Table 4 shows (i) number average molecular weights of the thermoplastic resins of respective Comparative Examples 7 and 8 and (ii) thermal conductivities of the thermoplastic resins themselves.

Examples 16 and 17

Mixtures were prepared in which (i) the liquid crystalline thermoplastic resin synthesized in Example 7 and (ii) boron nitride powder (h-BN) (PT110, produced by Momentive Performance Materials Inc.; a thermal conductivity per se: 60 W/(m·K); a volume average particle size: 45 μm; electrically insulative, a volume resistivity: $10^{14}$ Ω·cm) which is an inorganic filler were mixed in respective compositions shown in Table 5. AO-60 (produced by ADEKA CORPORATION) which is a phenolic stabilizer was added to each of the mixtures in 0.2 part by weight with respect to 100 parts by weight of thermoplastic resin. Then, the mixtures were melt-mixed by use of Labo-plastomill (30C150, produced by TOYO SEIKI SEISAKU-SHO, LTD) at 250° C. for 7 minutes, so as to obtain resin compositions to be evaluated. The resin compositions were molded into disk-shaped samples (6 mm in thickness×Φ20 mm) by an injection molding machine, so as to measure thermal conductivities of the respective disk-shaped samples. Table 5 shows a result of the measurement.

Comparative Examples 9 Through 12

In Comparative Examples 9 through 12, resin compositions to be evaluated were obtained as in the case of Example 16, except that the thermoplastic resin of Example 16 was replaced with the thermoplastic resins synthesized in Comparative Examples 7 and 8, respectively. Table 5 shows a result of measurement of thermal conductivities of the respective resin compositions.

Example 18

A mixture was prepared in which (i) the thermoplastic resin synthesized in Example 7 and (ii) natural plate-like graphite powder (GC) (BF-250A, produced by Chuetsu Graphite Works Co., Ltd.; a thermal conductivity per se: 1200 W/(m·K); a volume average particle size: 250.0 μm; electro-conductive;) were mixed in a composition shown in Table 6. AO-60 (produced by ADEKA CORPORATION) which is a phenolic stabilizer was added to the mixture in 0.2 part by weight with respect to 100 parts by weight of thermoplastic resin. Then, the mixture was melt-mixed by use of Labo-plastomill (30C150, produced by TOYO SEIKI SEISAKU-SHO, LTD) at 250° C. for 7 minutes, so as to obtain a resin composition to be evaluated. The resin composition was molded into a disk-shaped sample (6 mm in thickness x t 20 mm) by an injection molding machine, so as to measure a thermal conductivity of the disk-shaped sample. Table 6 shows a result of the measurement.

Comparative Examples 13 and 14

In Comparative Examples 13 and 14, resin compositions to be evaluated were obtained as in the case of Example 18, except that the thermoplastic resin of Example 18 was replaced with the thermoplastic resins synthesized in Comparative Examples 7 and 8, respectively. Table 6 shows a result of measurement of thermal conductivities of the respective resin compositions.

TABLE 3

| | Mesogenic Group M | | | Flexible Group Sp | | |
|---|---|---|---|---|---|---|
| | $A^1$ | x | $A^2$ | y | R | z |
| Ex. 3, Ex. 4, Ex. 5 | phenylene | (Direct Bond) | phenylene | $-O-\overset{O}{\underset{\|}{C}}-$ | $-(CH_2)_8-$ | $-\overset{O}{\underset{\|}{C}}-O-$ |
| Ex. 6, Ex. 7, Ex. 8 | phenylene | (Direct Bond) | phenylene | $-O-\overset{O}{\underset{\|}{C}}-$ | $-(CH_2)_{10}-$ | $-\overset{O}{\underset{\|}{C}}-O-$ |
| Ex. 9, Ex. 10, Ex. 11 | phenylene | (Direct Bond) | phenylene | $-O-\overset{O}{\underset{\|}{C}}-$ | $-(CH_2)_{12}-$ | $-\overset{O}{\underset{\|}{C}}-O-$ |
| Ex. 12 | phenylene | (Direct Bond) | phenylene | $-\overset{O}{\underset{\|}{C}}-O-$ | $-(CH_2)_{10}-$ | $-O-\overset{O}{\underset{\|}{C}}-$ |
| Ex. 13 | phenylene | (Direct Bond) | phenylene | $-\overset{O}{\underset{\|}{C}}-O-$ | $-(C_2H_5O)_2C_2H_5-$ | $-O-\overset{O}{\underset{\|}{C}}-$ |
| Ex. 14 | phenylene | $-O-\overset{O}{\underset{\|}{C}}-$ | phenylene | $-O-\overset{O}{\underset{\|}{C}}-$ | $-(CH_2)_{10}-$ | $-\overset{O}{\underset{\|}{C}}-O-$ |
| Ex. 15 | phenylene | $-N(O)=N-$ | phenylene | $-O-\overset{O}{\underset{\|}{C}}-$ | $-(CH_2)_{10}-$ | $-\overset{O}{\underset{\|}{C}}-O-$ |

TABLE 4

| | Ex. 3 | Ex. 4 | Ex. 5 | Ex. 6 | Ex. 7 | Ex. 8 |
|---|---|---|---|---|---|---|
| Number Average Molecular Weight | 8160 | 12000 | 34400 | 8500 | 10700 | 24100 |
| Ratio of Lamellar Crystals (%) | 42 | 60 | 33 | 95 | 90 | 13 |
| Density (g/cm³) | 1.24 | 1.24 | 1.24 | 1.20 | 1.20 | 1.20 |
| Thermal Conductivity of Resin per se [W/m · K] | 0.60 | 0.72 | 0.55 | 1.36 | 1.27 | 0.46 |

| | Ex. 9 | Ex. 10 | Ex. 11 | Ex. 12 | Ex. 13 | Ex. 14 | Ex. 15 |
|---|---|---|---|---|---|---|---|
| Ratio of Lamellar Crystals (%) | 67 | 88 | 42 | 51 | 22 | 87 | 74 |
| Density (g/cm³) | 1.17 | 1.17 | 1.17 | 1.20 | 1.24 | 1.21 | 1.19 |
| Number Average Molecular Weight | 7960 | 13600 | 18800 | 8470 | 9660 | 12400 | 8930 |
| Thermal Conductivity of Resin per se [W/m · K] | 0.80 | 1.16 | 0.60 | 0.65 | 0.50 | 1.17 | 0.92 |

TABLE 4-continued

|  | Com. Ex. 5 | Com. Ex. 6 | Com. Ex. 7 | Com. Ex. 8 |
|---|---|---|---|---|
| Number Average Molecular Weight | 1870 | 42400 | 1920 | 41600 |
| Ratio of Lamellar Crystals (%) | 1.3 | 5.5 | 1.0 | 1.5 |
| Density (g/cm$^3$) | 1.24 | 1.24 | 1.20 | 1.20 |
| Thermal Conductivity of Resin per se [W/m·K] | 0.40 | 0.42 | 0.39 | 0.42 |

TABLE 5

| Composition [vol %] |  | Ex. 16 | Ex. 17 | Com. Ex. 9 | Com. Ex. 10 | Com. Ex. 11 | Com. Ex. 12 |
|---|---|---|---|---|---|---|---|
| Resin (A) | Ex. 7 | 70 | 50 |  |  |  |  |
|  | Com. Ex. 7 |  |  | 70 | 50 |  |  |
|  | Com. Ex. 8 |  |  |  |  | 70 | 50 |
| Inorganic Substance (B) | h-BN | 30 | 50 | 30 | 50 | 30 | 50 |
|  | GC |  |  |  |  |  |  |
| Thermal Conductivity (W/m·K) |  | 5.4 | 21 | 1.8 | 7.0 | 1.6 | 7.1 |
| Density [g/cm$^3$] |  | 1.52 | 1.74 | 1.52 | 1.74 | 1.52 | 1.74 |

TABLE 6

| Composition [vol %] |  | Ex. 18 | Com. Ex. 13 | Com. Ex. 14 |
|---|---|---|---|---|
| Resin (A) | Ex. 7 | 50 |  |  |
|  | Com. Ex. 7 |  | 50 |  |
|  | Com. Ex. 8 |  |  | 50 |
| Inorganic Substance (B) | h-BN |  |  |  |
|  | GC | 50 | 50 | 50 |
| Thermal Conductivity (W/m·K) |  | 60 | 20 | 21 |
| Density [g/cm$^3$] |  | 1.72 | 1.71 | 1.71 |

Production Example 1

4,4' dihydroxybiphenyl, sebacic acid, and acetic anhydride were placed in a molar ratio of 1:1.05:2.1 in a sealed reactor vessel. An acetylated reaction was carried out under an ordinary pressure in an atmosphere of nitrogen gas at 145° C. for 1 hour. Then, polycondensation was conducted in the vessel heated to 290° C. at a rate of temperature increase of 0.5° C./min. When an amount of distillate acetic acid reached 90% of a theoretical yield of acetic acid, approximately 20 minutes were spent to decompress the vessel to not more than 0.5 torr with the temperature maintained at 290° C., so as to carry out melt polymerization until the polymer was grown to a high molecular weight. After two hours, the pressure inside the vessel was brought back to an ordinary pressure with and then a generated polymer was collected. Table 7 shows (i) a molecular structure and (ii) a thermal conductivity of resin per se of the thermoplastic resin of Production Example 1.

Examples 19 and 20

Mixtures were prepared in which (i) the thermoplastic resin synthesized in Production Example 1 and (ii) boron nitride powder (h-BN) (PT110, produced by Momentive Performance Materials Inc.; a thermal conductivity per se: 60 W/m·K; a volume average particle size: 45 μm; electrically insulative, a volume resistivity: $10^{14}$ Ω·cm) which is an inorganic filler were mixed in respective compositions shown in Table 8. AO-60 (produced by ADEKA CORPORATION) which is a phenolic stabilizer was added to each of the mixtures in 0.2 part by weight with respect to 100 parts by weight of thermoplastic resin. Then, the mixtures were melt-mixed by use of Labo-plastomill (30C150, produced by TOYO SEIKI SEISAKU-SHO, LTD) at 250° C. for 7 minutes, so as to obtain resin compositions to be evaluated. The resin compositions were molded into disk-shaped samples (6 mm in thickness×Φ20 mm) by an injection molding machine, so as to measure thermal conductivities of the respective disk-shaped samples. Table 8 shows a result of the measurement.

Production Examples 2 Through 4

In Production Examples 2 through 4, polymerization was carried out as in the case of Production Example 1, except that (i) sebacic acid used in Production Example 1 was replaced with dodecanedioic acid, tetradecanedioic acid, and eicosanedioic acid, respectively and (ii) the polymerization temperature of Production Example 1 was changed to 280° C., 270° C., and 260° C., respectively. Table 7 shows (i) molecular structures and (ii) thermal conductivities of resin per se of the thermoplastic resins of respective Production Examples 2 through 4.

Production Example 5

4,4'-biphenyldicarboxylic acid dimethyl and 1,8-octane diol were placed in a polymerization reactor, and methanol was distilled by carrying out an ester exchange reaction at a temperature of 220° C. Then, TBT (tetrabutyl titanate) was added as a catalyst in 5×10$^{-4}$ mol with respect to 1 mol of structural units of polyester, so as to carry out a polycondensation reaction under a reduced pressure of 1.0 torr at 240° C. for 3 hours. Thereafter, the pressure inside the reactor was brought back to an ordinary pressure with an inert gas and then a generated polymer was collected. Table 7 shows (i) a molecular structure and (ii) a thermal conductivity of resin per se of the thermoplastic resin of Production Example 5.

Production Example 6

In Production Example 6, polymerization was carried out as in the case of Production Example 5, except that 1,8-octane diol used in Production Example 5 was replaced with triethylene glycol. Table 7 shows (i) a molecular structure of the thermoplastic resin of Production Example 6 and (ii) a thermal conductivity of the thermoplastic resin itself.

Production Example 7

4-acetoxybenzoic acid-acetoxyphenyl and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to not more than 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 7 shows (i) a molecular structure of the thermoplastic resin of Production Example 7 and (ii) a thermal conductivity of the thermoplastic resin itself.

Production Example 8

4,4'-diacetoxyazoxybenzene and dodecanedioic acid were placed in a molar ratio of 1:1.05 in a sealed reactor vessel. Then, polycondensation was conducted in the vessel heated to 280° C. at a rate of temperature increase of 1° C./min under an ordinary pressure in an atmosphere of nitrogen gas. When an amount of distillate acetic acid reached 90% of a theoretical yield of acetic acid, approximately 20 minutes were spent to decompress the vessel to not more than 10 torr with the temperature maintained at 280° C., so as to carry out melt polymerization until the polymer was grown to a high molecular weight. One and a half hour after the beginning of the decompression, the pressure inside the vessel was brought back to an ordinary pressure with an inert gas and then a generated polymer was collected. Table 7 shows (i) a molecular structure of the thermoplastic resin of Production Example 8 and (ii) a thermal conductivity of the thermoplastic resin itself.

Examples 21 Through 30

Tables 8 and 9 show results obtained by blending, as in the case of Examples 19 and 20, inorganic fillers with the thermoplastic resins synthesized in respective Production Examples 2 through 8.

Examples 31 Through 33

Mixtures were prepared in which (i) the thermoplastic resins synthesized in Production Examples 1 through 3 and (ii) glass fiber (GF) (T187H/PL, produced by Nippon Electric Glass Co., Ltd.; a thermal conductivity per se: 1.0 W/m·K; a fiber diameter: 13 μm; a number average fiber length: 3.0 mm; electrically insulative, a volume resistivity: $10^{15}$ Ω·cm) which is an inorganic filler were mixed in respective compositions shown in Table 11. AO-60 (produced by ADEKA CORPORATION) which is a phenolic stabilizer was added to each of the mixtures in 0.2 part by weight with respect to 100 parts by weight of thermoplastic resin. Then, the mixtures were melt-mixed by use of Labo-plastomill (30C150, produced by TOYO SEIKI SEISAKU-SHO, LTD) at 250° C. for 7 minutes, so as to obtain resin compositions to be evaluated. The resin compositions were molded into disk-shaped samples (6 mm in thickness×Φ20 mm) by an injection molding machine, so as to measure thermal conductivities of the respective disk-shaped samples. Table 11 shows a result of the measurement.

Example 34

A mixture was prepared in which (i) the thermoplastic resin synthesized in Production Example 1 and (ii) natural plate-like graphite powder (GC) (BF-250A, produced by Chuetsu Graphite Works Co., Ltd.; a thermal conductivity per se: 1200 W/(m·K); a volume average particle size: 250.0 μm; electro-conductive;) were mixed in a composition shown in Table 12. AO-60 (produced by ADEKA CORPORATION) which is a phenolic stabilizer was added to the mixture in 0.2 part by weight with respect to 100 parts by weight of thermoplastic resin. Then, the mixture was melt-mixed by use of Labo-plastomill (30C150, produced by TOYO SEIKI SEISAKU-SHO, LTD) at 250° C. for 7 minutes, so as to obtain a resin composition to be evaluated. The resin composition was molded into a disk-shaped sample (6 mm in thickness×Φ20 mm) by an injection molding machine, so as to measure a thermal conductivity of the disk-shaped sample. Table 12 shows a result of the measurement.

Comparative Examples 15 Through 20

In Comparative Examples 15 through 20, resin compositions were obtained as in the case of Examples 19 and 20, except that instead of the thermoplastic resin, polycarbonate (PC) (TARFLON A-2200, produced by Idemitsu Kosan Co., Ltd.), polyethylene terephthalate (PET) (BELLPET EFG-70, produced by Bell Polyester Products, Inc.), and a liquid crystal polymer (LCP) (5000G, produced by UENO FINE CHEMICALS INDUSTRY, LTD.) were used. The resin compositions were obtained by blending boron nitride powder as an inorganic filler with PC, PET, and LCP. Then, the resin compositions thus obtained were molded into disk-shaped samples (6 mm in thickness×Φ20 mm), so as to measure thermal conductivities of the respective disk-shaped samples. Table 7 shows (i) molecular structures of respective PC, PET, and LCP and (ii) thermal conductivities of the respective PC, PET, and LCP themselves. Note that a molecular structure of LCP is such that $A^1$ and $A^2$ are bonded via a binding group in a random order. Table 10 shows a result for the resin compositions of respective Comparative Examples 15 through 20.

Comparative Examples 21 Through 23

In Comparative Examples 21 through 23, resin compositions were obtained as in the case of Examples 31 through 33, except that glass fiber was used as an inorganic filler. The resin compositions thus obtained were molded into disk-shaped samples (6 mm in thickness×Φ20 mm), so as to measure thermal conductivities of the respective disk-shaped samples. Table 11 shows a result for the resin compositions of respective Comparative Examples 21 through 23.

Comparative Example 24

In Comparative Example 24, a resin compositions was obtained as in the case of, except that PET was used instead of the thermoplastic resin. The resin composition was obtained by blending natural plate-like graphite powder as an inorganic filler with PET. Then, the resin composition thus obtained was molded into a disk-shaped sample (6 mm in thickness×Φ20 mm), so as to measure a thermal conductivity of the disk-shaped sample. Table 12 shows a result for the resin composition of Comparative Examples 24.

TABLE 7

| | Mesogenic Group M | | | Spacer Sp | | | Thermal Conductivity of Resin per se [W/m·K] |
|---|---|---|---|---|---|---|---|
| | $A^1$ | x | $A^2$ | y | R | z | |
| Prod. Ex. 1 | phenylene | — (Direct Bond) | phenylene | —O—C(=O)— | —(CH$_2$)$_8$— | —C(=O)—O— | 0.67 |
| Prod. Ex. 2 | phenylene | — (Direct Bond) | phenylene | —O—C(=O)— | —(CH$_2$)$_{10}$— | —C(=O)—O— | 1.27 |
| Prod. Ex. 3 | phenylene | — (Direct Bond) | phenylene | —O—C(=O)— | —(CH$_2$)$_{12}$— | —C(=O)—O— | 1.16 |
| Prod. Ex. 4 | phenylene | — (Direct Bond) | phenylene | —O—C(=O)— | —(CH$_2$)$_{18}$— | —C(=O)—O— | 0.48 |
| Prod. Ex. 5 | phenylene | — (Direct Bond) | phenylene | —C(=O)—O— | —(CH$_2$)$_8$— | —O—C(=O)— | 0.45 |
| Prod. Ex. 6 | phenylene | — (Direct Bond) | phenylene | —C(=O)—O— | —(C$_2$H$_5$O)$_2$C$_2$H$_5$— | —O—C(=O)— | 0.50 |
| Prod. Ex. 7 | phenylene | —O—C(=O)— | phenylene | —O—C(=O)— | —(CH$_2$)$_{10}$— | —C(=O)—O— | 1.17 |
| Prod. Ex. 8 | phenylene | —N(O)=N— | phenylene | —O—C(=O)— | —(CH$_2$)$_{10}$— | —C(=O)—O— | 0.92 |
| PC | phenylene | —C(CH$_3$)$_2$— | phenylene | —O—C(=O)— | None | —O— | 0.18 |
| PET | phenylene | None | None | —C(=O)—O— | —(CH$_2$)$_2$— | —O—C(=O)— | 0.28 |
| LCP | phenylene | —O—C(=O)— | naphthylene | —O—C(=O)— | None | None | 0.21 |

TABLE 8

| Composition [vol %] | | Ex. 19 | Ex. 20 | Ex. 21 | Ex. 22 | Ex. 23 | Ex. 24 |
|---|---|---|---|---|---|---|---|
| Resin (A) | Prod. Ex. 1 | 70 | 50 | | | | |
| | Prod. Ex. 2 | | | 70 | 50 | | |
| | Prod. Ex. 3 | | | | | 70 | 50 |
| Inorganic Substance (B) | h-BN | 30 | 50 | 30 | 50 | 30 | 50 |
| | GF | | | | | | |
| | GC | | | | | | |
| Thermal Conductivity (W/m·K) | | 2.9 | 11 | 5.4 | 21 | 5.0 | 19 |
| Density [g/cm$^3$] | | 1.56 | 1.76 | 1.52 | 1.74 | 1.50 | 1.72 |

TABLE 9

| Composition [vol %] | | Ex. 25 | Ex. 26 | Ex. 27 | Ex. 28 | Ex. 29 | Ex. 30 |
|---|---|---|---|---|---|---|---|
| Resin (A) | Prod. Ex. 4 | 70 | 50 | | | | |
| | Prod. Ex. 5 | | | 70 | | | |
| | Prod. Ex. 6 | | | | 70 | | |
| | Prod. Ex. 7 | | | | | 70 | |
| | Prod. Ex. 8 | | | | | | 70 |
| Inorganic Substance (B) | h-BN | 30 | 50 | 30 | 30 | 30 | 30 |
| | GF | | | | | | |
| | GC | | | | | | |
| Thermal Conductivity (W/m·K) | | 2.1 | 7.9 | 2.0 | 2.2 | 5.0 | 3.9 |
| Density [g/cm³] | | 1.47 | 1.70 | 1.56 | 1.52 | 1.52 | 1.52 |

TABLE 10

| Composition [vol %] | | Com. Ex. 15 | Com. Ex. 16 | Com. Ex. 17 | Com. Ex. 18 | Com. Ex. 19 | Com. Ex. 20 |
|---|---|---|---|---|---|---|---|
| Resin (A) | PC | 70 | 50 | | | | |
| | PET | | | 70 | 50 | | |
| | LCP | | | | | 70 | 50 |
| Inorganic Substance (B) | h-BN | 30 | 50 | 30 | 50 | 30 | 50 |
| | GF | | | | | | |
| | GC | | | | | | |
| Thermal Conductivity (W/m·K) | | 1.4 | 5.3 | 1.3 | 5.8 | 1.8 | 6.0 |
| Density [g/cm³] | | 1.54 | 1.75 | 1.65 | 1.83 | 1.66 | 1.82 |

TABLE 11

| Composition [vol %] | | Ex. 31 | Ex. 32 | Ex. 33 | Com. Ex. 21 | Com. Ex 22 | Com. Ex 23 |
|---|---|---|---|---|---|---|---|
| Resin (A) | Prod. Ex. 1 | 85 | | | | | |
| | Prod. Ex. 2 | | 85 | | | | |
| | Prod. Ex. 3 | | | 85 | | | |
| | PC | | | | 85 | | |
| | PET | | | | | 85 | |
| | LCP | | | | | | 85 |
| Inorganic Substance (B) | h-BN | | | | | | |
| | GF | 15 | 15 | 15 | 15 | 15 | 15 |
| | GC | | | | | | |
| Therma Conductivity (W/m·K) | | 0.80 | 1.25 | 1.15 | 0.25 | 0.32 | 0.32 |
| Density [g/cm³] | | 1.45 | 1.40 | 1.38 | 1.42 | 1.51 | 1.57 |

TABLE 12

| Composition [vol %] | | Ex. 34 | Com. Ex. 24 |
|---|---|---|---|
| Resin (A) | Prod. Ex. 1 | 50 | |
| | PET | | 50 |
| Inorganic Substance (B) | h-BN | | |
| | GF | | |
| | GC | 50 | 50 |
| Thermal Conductivity (W/m·K) | | 45 | 24 |
| Density [g/cm³] | | 1.72 | 1.79 |

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

Since the thermoplastic resin of the present invention has an excellent thermal conductivity and allows maintenance of a high thermal conductivity of a resin composition without the need of blending, with the thermoplastic resin, a highly thermally conductive inorganic compound in a large amount, the resin composition can be injection-molded by use of a general-purpose mold for injection molding. Such a resin composition, which is usable as a heat-resistant material for various fields such as electric and electronic industries and an automotive field, is industrially useful.

The invention claimed is:

1. A thermoplastic resin composition comprising:
an inorganic filler; and
a thermoplastic resin whose main chain contains substantially only a repeating unit represented by the general formula (2):

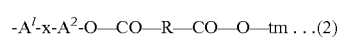

-A¹-x-A²-O—CO—R—CO—O—tm ...(2)

the thermoplastic resin having a thermal conductivity of not less than 0.45 W/m·K;
wherein each of $A^1$ and $A^2$ independently represents a substituent group selected from the group consisting of an aromatic group, a condensed aromatic group, and an alicyclic heterocyclic group; x represents a direct bond; and R represents a bivalent substituent group which has a main chain length of 2 to 20 atoms and may be branched;

wherein a part of the thermoplastic resin which part corresponds to -A$^1$-x-A$^2$- is a mesogenic group represented by the general formula (3):

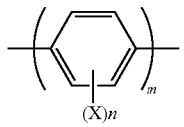
(3)

wherein X independently represents an aliphatic hydrocarbon group, F, Cl, Br, I, CN, or NO$_2$; n represents an integer of 0 to 4; and m represents an integer of 2.

2. The thermoplastic resin composition as set forth in claim 1, wherein the thermoplastic resin has a number average molecular weight of 3000 to 40000.

3. The thermoplastic resin composition as set forth in claim 1, wherein the thermoplastic resin has a density of not less than 1.1 g/cm$^3$.

4. The thermoplastic resin composition as set forth in claim 1, wherein the thermoplastic resin contains, in a resin component thereof, lamellar crystals in a ratio of not less than 10 vol% to the resin component.

5. The thermoplastic resin composition as set forth in claim 1, wherein R of the general formula (2) is a linear aliphatic hydrocarbon chain.

6. The thermoplastic resin composition as set forth in claim 5, wherein R contains at least one kind of repeating unit which is selected from the group consisting of —(CH$_2$)$_8$—, —(CH$_2$)$_{10}$—, and —(CH$_2$)$_{12}$— and is represented by the general formula (2).

7. The thermoplastic resin composition as set forth in claim 1, wherein the inorganic filler is at least one kind of highly thermally conductive inorganic compound selected from the group consisting of graphite, conductive metal powder, soft magnetic ferrite, carbon fiber, conductive metal fiber, zinc oxide, and carbon nanotube.

8. The thermoplastic resin composition as set forth in claim 1, wherein the inorganic filler is at least one kind of electrically insulative thermally conductive inorganic compound selected from the group consisting of boron nitride, aluminum nitride, silicon nitride, aluminum oxide, magnesium oxide, magnesium carbonate, aluminum hydroxide, magnesium hydroxide, beryllium oxide, and diamond.

9. A thermoplastic resin composition comprising:
an inorganic filler having a thermal conductivity of not less than 20 W/m·K; and
a thermoplastic resin whose main chain contains a repeating unit represented by the general formula (2):

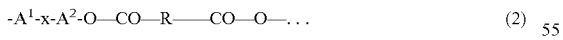
-A$^1$-x-A$^2$-O—CO—R—CO—O— ... (2)

the thermoplastic resin having a thermal conductivity of not less than 0.45 W/m·K;
wherein each of A$^1$ and A$^2$ independently represents a substituent group selected from the group consisting of an aromatic group, a condensed aromatic group, and an alicyclic heterocyclic group; x represents a direct bond; and R represents a bivalent substituent group which has a main chain length of 2 to 20 atoms and may be branched, wherein:
a part of the general formula (2) which part corresponds to -A$^1$-x-A$^2$- is a mesogenic group represented by the general formula (3):

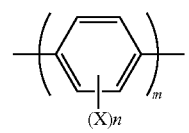
(3)

wherein X independently represents an aliphatic hydrocarbon group, F, Cl, Br, I, CN, or NO$_2$; n represents an integer of 0 to 4; and
m represents an integer of 2 ; and
R of the general formula (2) is a linear aliphatic hydrocarbon chain.

10. The thermoplastic resin composition as set forth in claim 9, wherein the thermoplastic resin has a number average molecular weight of 3000 to 40000.

11. The thermoplastic resin composition as set forth in claim 9, wherein the thermoplastic resin has a density of not less than 1.1 g/cm$^3$.

12. The thermoplastic resin composition as set forth in claim 9, wherein the thermoplastic resin contains, in a resin component thereof, lamellar crystals in a ratio of not less than 10 vol% to the resin component.

13. The thermoplastic resin composition as set forth in claim 9, wherein the inorganic filler is at least one kind of highly thermally conductive inorganic compound selected from the group consisting of graphite, conductive metal powder, soft magnetic ferrite, carbon fiber, conductive metal fiber, zinc oxide, and carbon nanotube.

14. The thermoplastic resin composition as set forth in claim 9, wherein the inorganic filler is at least one kind of electrically insulative thermally conductive inorganic compound selected from the group consisting of boron nitride, aluminum nitride, silicon nitride, aluminum oxide, magnesium oxide, aluminum hydroxide, magnesium hydroxide, beryllium oxide, and diamond.

15. A thermoplastic resin comprising, in its main chain, substantially only a repeating unit represented by the general formula (2):

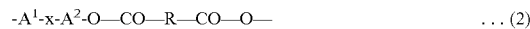
-A$^1$-x-A$^2$-O—CO—R—CO—O— ... (2)

the thermoplastic resin having a thermal conductivity of not less than 0.45 W/m·K;
wherein each of A$^1$ and A$^2$ independently represents a substituent group selected from the group consisting of an aromatic group, a condensed aromatic group, and an alicyclic heterocyclic group; x represents a direct bond; and R represents a bivalent substituent group which has a main chain length of 2 to 20 atoms and may be branched,
wherein a part of the thermoplastic resin which part corresponds to -A$^1$-x-A$^2$- is a mesogenic group represented by the general formula (3):

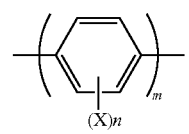
(3)

wherein X independently represents an aliphatic hydrocarbon group, F, Cl, Br, I, CN, or NO2; n represents an integer of 0 to 4; and m represents an integer of 2, and the thermoplastic resin containing, in a resin component thereof, lamellar crystals in a ratio of not less than 10 vol% to the resin component.

16. The thermoplastic resin as set forth in claim 15, wherein the thermoplastic resin has a number average molecular weight of 3000 to 40000.

17. The thermoplastic resin as set forth in claim 15, wherein the thermoplastic resin has a density of not less than 1.1 g/cm$^3$.

18. The thermoplastic resin as set forth in claim 15, wherein R of the general formula (2) is a linear aliphatic hydrocarbon chain.

19. The thermoplastic resin as set forth in claim 18, wherein R of the general formula (2) contains at least one kind of repeating unit which is selected from the group consisting of —(CH$_2$)$_8$—, —(CH$_2$)$_{10}$—, and —(CH$_2$)$_{12}$—and is represented by the general formula (2).

20. A thermoplastic resin comprising, in its main chain, a repeating unit represented by the general formula (2):

    -A$^1$-x-A$^2$—O—CO—R—CO—O—    ...(2)

the thermoplastic resin having a thermal conductivity of not less than 0.45 W/m·K;

wherein each of A$^1$ and A$^2$ independently represents a substituent group selected from the group consisting of an aromatic group, a condensed aromatic group, and an alicyclic heterocyclic group; x represents a direct bond; and R represents a bivalent substituent group which has a main chain length of 2 to 20 atoms and may be branched;

wherein:
a part of the general formula (2) which part corresponds to -A$^1$-x-A$^2$- is a mesogenic group represented by the general formula (3):

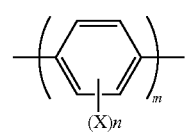

(3)

wherein X independently represents an aliphatic hydrocarbon group, F, Cl, Br, I, CN, or NO$_2$; n represents an integer of 0 to 4; and m represents an integer of 2;

R of the general formula (2) is a linear aliphatic hydrocarbon chain; and the thermoplastic resin contains, in a resin component thereof, lamellar crystals in a ratio of not less than 10 vol% to the resin component.

21. The thermoplastic resin as set forth in claim 20, wherein the thermoplastic resin has a number average molecular weight of 3000 to 40000.

22. The thermoplastic resin as set forth in claim 20, wherein the thermoplastic resin has a density of not less than 1.1 g/cm$^3$.

23. The thermoplastic resin as set forth in claim 20, wherein R contains at least one kind of repeating unit which is selected from the group consisting of —(CH$_2$)$_8$—, —(CH$_2$)$_{10}$—, and —(CH$_2$)$_{12}$—and is represented by the general formula (2).

* * * * *